United States Patent
da Silva et al.

(10) Patent No.: US 11,606,707 B2
(45) Date of Patent: *Mar. 14, 2023

(54) MEASUREMENT REPORTING CONFIGURATION FOR AIDING THE SORTING OF BEAM/CELL LEVEL MEASUREMENTS

(71) Applicant: TELEFONAKTIEBOLAGET LM ERICSSON (PUBL), Stockholm (SE)

(72) Inventors: Icaro L. J. da Silva, Solna (SE); Pradeepa Ramachandra, Linköping (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,283

(22) Filed: Jul. 30, 2020

(65) Prior Publication Data

US 2020/0404526 A1 Dec. 24, 2020

Related U.S. Application Data

(63) Continuation of application No. 16/370,097, filed on Mar. 29, 2019, now Pat. No. 10,772,001, which is a (Continued)

(51) Int. Cl.
*H04W 24/10* (2009.01)
*H04B 17/318* (2015.01)
(Continued)

(52) U.S. Cl.
CPC .......... *H04W 24/10* (2013.01); *H04B 7/0626* (2013.01); *H04B 17/318* (2015.01);
(Continued)

(58) Field of Classification Search
CPC .... H04B 7/0626; H04B 7/0639; H04B 17/24; H04B 17/318; H04B 17/327;
(Continued)

(56) References Cited

U.S. PATENT DOCUMENTS 8,526,322 B2 9/2013 Jung
8,565,784 B2 10/2013 Zhang
(Continued)

FOREIGN PATENT DOCUMENTS

CN 1756409 A 4/2006
CN 103125133 A 5/2013
(Continued)

OTHER PUBLICATIONS

ZTE Corporation, Sane Chips, "Remaining issues on measurement report content",3GPP TSG-RAN WG2 Meeting #99bis, R2-1710433, Oct. 9-13, 2017.

(Continued)

*Primary Examiner* — Thomas R Cairns

(57) ABSTRACT

According to certain embodiments, a method performed by a wireless device (110) for measurement reporting includes sorting a plurality of measurements for a measurement report based on at least one measurement quantity. The method further includes reporting, to a network node (160), measurement information selected from the plurality of measurements sorted based on the at least one measurement quantity.

22 Claims, 14 Drawing Sheets

Related U.S. Application Data continuation of application No. PCT/IB2018/059355, filed on Nov. 27, 2018.

(60) Provisional application No. 62/592,216, filed on Nov. 29, 2017.

(51) Int. Cl.
    *H04B 17/336* (2015.01)
    *H04B 17/345* (2015.01)
    *H04B 7/06* (2006.01)
    *H04L 1/00* (2006.01)
    *H04W 36/00* (2009.01)

(52) U.S. Cl.
    CPC ......... *H04B 17/336* (2015.01); *H04B 17/345* (2015.01); *H04L 1/0026* (2013.01); *H04W 36/0085* (2018.08)

(58) Field of Classification Search
    CPC ............... H04B 17/336; H04B 17/345; H04L 1/0026; H04L 43/06; H04W 8/005; H04W 24/02; H04W 24/10; H04W 36/00; H04W 36/0058; H04W 36/0083; H04W 36/0088; H04W 40/24; H04W 52/365; H04W 72/08; H04W 36/0085–0094
    See application file for complete search history.

(56) References Cited

U.S. PATENT DOCUMENTS

| | | | |
|---|---|---|---|
| 8,660,559 B2 * | 2/2014 | Tamura | H04L 5/001 455/436 |
| 9,125,127 B2 | 9/2015 | Wei | |
| 10,009,782 B2 | 6/2018 | Kazmi et al. | |
| 10,028,162 B2 | 7/2018 | Wang | |
| 10,098,030 B2 | 10/2018 | Miao et al. | |
| 10,111,123 B2 | 10/2018 | Rune et al. | |
| 10,172,026 B2 | 1/2019 | Chaudhuri et al. | |
| 10,284,315 B2 | 5/2019 | Reial et al. | |
| 2005/0176469 A1 | 8/2005 | Stern-Berkowitz et al. | |
| 2016/0323903 A1 | 11/2016 | Fujishiro | |
| 2017/0127306 A1 | 5/2017 | Tan Bergström | |
| 2017/0331670 A1 | 11/2017 | Parkvall | |
| 2018/0091204 A1 | 3/2018 | Islam et al. | |
| 2018/0176710 A1 | 6/2018 | Jang et al. | |
| 2018/0192426 A1 | 7/2018 | Ryoo | |
| 2018/0219664 A1 * | 8/2018 | Guo | H04B 17/318 |
| 2018/0310354 A1 | 10/2018 | Jeon et al. | |
| 2019/0053072 A1 | 2/2019 | Kundargi et al. | |
| 2019/0075478 A1 | 3/2019 | Lunden | |
| 2019/0116605 A1 | 4/2019 | Luo | |

FOREIGN PATENT DOCUMENTS

| | | | | |
|---|---|---|---|---|
| CN | 106134236 A | 11/2016 | | |
| JP | 2013534763 A | 9/2013 | | |
| JP | 2016507177 A | 3/2016 | | |
| WO | 2012051861 A1 | 4/2012 | | |
| WO | 2014112789 A1 | 7/2014 | | |
| WO | WO-2016163936 A1 * | 10/2016 | ......... | H04B 17/309 |
| WO | 2017014111 A1 | 1/2017 | | |

OTHER PUBLICATIONS

Huawei, HiSilicon, "Reamining issues on Measurement report", 3GPP TSG-RAN WG2#99bis, R2-1710571, Oct. 9-13, 2017.

3GPP TS 38.331 V0.1.0 (Oct. 2017): "3GPP TS 38.331 V0.1.0 (Oct. 2017); 3rd Generation Partnership Project; Technical Specification Group Radio Access Network; NR; Radio Resource Control (RRC); Protocol specification (Release 15)", 3GPP Standard; Technical Specification; 3GPP TS 38.331, 3rd Generation Partnership Project (3GPP), Mobile Competence Centre , 650, Route Des Lucioles ; F-06921 Sophia-Antipolis Cedex ; France, vol. RAN WG2, No. V0.1.0, Nov. 21, 2017 (Nov. 21, 2017), pp. 1-154, XP051450269.

3GPP TSG-RAN WG2 NR AH#3; R2-1801646; Draft Update to Flag for Beam ID reporting (Issue S005), 3GPP Draft; R2-1801646 Beam ID S005-Updated Version of R2-1801610 (V2), 3rd Generation Partnership Project (3GPP), Mobile Competence Centre ; 650, Route Des Lucioles ; F-06921 Sophia-Antipolis Cedex vol. RAN WG2, No. Vancouver, Canada; Jan. 22, 2018-Jan. 26, 2018 Jan. 27, 2018 (Jan. 27, 2018), XP051387075.

Ericsson: "3GPP TSG-RAN WG2 AH-1801; R2-1801314; Beam sorting order for measurement reporting", 3GPP Draft; R2-1801314—Beam Sorting Order for Measurement Reporting, 3rd Generation Partnership Project (3GPP), Mobile Competence Centre ; 650, Route Des Lucioles ; F-06921 Sophia-Antipolis Cedex vol. RAN WG2, No. Vancouver, Canada; Jan. 22, 2018-Jan. 26, 2018 Jan. 12, 2018 (Jan. 12, 2018), XP051386734.

Huawei, HiSilicon, "Corrections on RRM TP", 3GPP TSG-RAN WG2#100 Meeting, R2-1713427, Reno, Nevada, US, Nov. 27-Dec. 1, 2017.

Cheng, Fei et al. ""Spectrum analysis compression algorithm of measure report data,"" Jml. of Xidian U., vol. 43, No. 4, Sc. of Comp.Sci.& Tech., Xidian U., Xi'an, 710071, China; http://dialog.proquest.com/professional/docview/1863678851 ?accountid=142257 [Retrieved Jul. 24, 2019], Pub. Aug. 2016, pp. 1-9 (Year: 2016).

Möll, Hans-Peter, "Written Opinion of the International Searching Authority, PCT/IB2018/059355," European Patent Office, https://patentscope.wipo.int/search/en/detail.jsf?docId =WO2019106536 &tab=PCTDOCU ME NTS&_cid =P20-JZCR2 I-25333-1 [Retrieved Jul. 23, 2019], Published (Year: 2019).

3GPP, "Technical Specification; 3rd Generation Partnership Project; Technical Specification Group Radio Access Network; NR; Radio Resource Control (RRC); Protocol Specification (Release 15)", TS 38.331 V0.1.0, 3GPP TSG RAN WG2 # 100, R2-1713629, Oct. 2017, pp. 1-154.

* cited by examiner

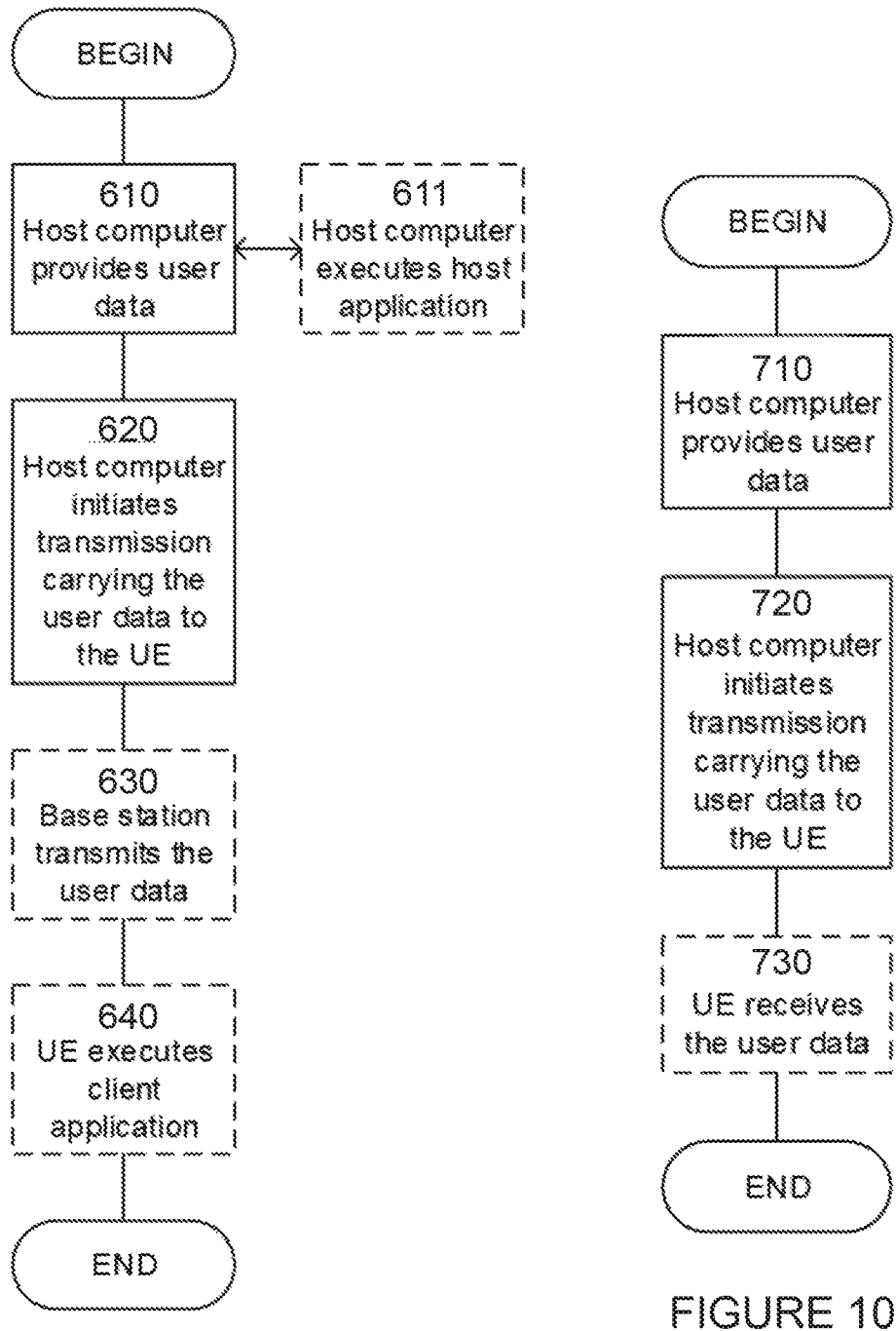

MEASUREMENT REPORTING CONFIGURATION FOR AIDING THE SORTING OF BEAM/CELL LEVEL MEASUREMENTS

RELATED APPLICATIONS

This application is a continuation of co-pending U.S. patent application Ser. No. 16/370,097 filed on Mar. 29, 2019, which is a Continuation of International Patent Application PCT/IB2018/059355, filed Nov. 27, 2018, which claims the benefit of U.S. Provisional Application No. 62/592,216, filed Nov. 29, 2017 and entitled "Measurement reporting configuration for aiding the sorting of beam/cell level measurements," the disclosures of which are all hereby incorporated by reference.

BACKGROUND

It has been agreed in RAN2 that the beam level reporting is supported in NR.

Specifically, it has been agreed that:

Beam measurement (based on New Radio-Synchronization Signal (NR-SS) and Channel State Information-Reference Signal (CSI_RS)) can be included in the measurement report and can be configured by the network (i.e., network configures the user equipment (UE) to report beam identifier only, beam measurement result and identifier, or no beam reporting)

Measurement quantities can be configured by the network for beam measurement reporting. RAN1 to confirm the measurement quantities supported.

For selection of x synchronization signal (SS) blocks to be included in the measurement report for each cell: x can be configured separately from N (N used in cell quality derivation).

Measurement quantity to be reported for beam measurements can be the same as (cell) trigger quantity or both RSRP/RSRQ.

For measurement events based on NR-SS, in each cell the best SS block is reported and up to x-1 next highest measured SS blocks above the absolute threshold. Threshold is the same as that used for cell quantity derivation.

For measurement events based on CSI-RS, in each cell the best CSI-RS is reported and up to y-1 next highest measured CSI-RS above the absolute threshold. Threshold is the same as that used for cell quality derivation.

The beam level information (beam IDS and/or available measurements results of primary cell (PCell)/primary secondary cell (PSCell) and secondary cell (SCell) is included in the measurement report if the network has configured the UE to do so.

Based on these agreements, for an event triggered measurement report, the UE shall report the beam level measurements of PCell, PSCell, SCell, and cells in the triggered-CellsList.

Further, beam related measurement quantities to be reported for the cells in triggeredCellsList can be configured (independent of the measurement quantities to be reported for the cells) as follows: Beam index only, Beam index and beam RSRP, Beam index and beam RSRQ, or Beam index and beam signal-to-interference-plus-noise ratio (SINR). In each cell the best SS block/CSI-RS is always included in the measurement report and up to x-1/y-1 next highest measured SS blocks/CSI-RS is included in the measurement report.

Additionally, there will be support for periodic measurement reporting in NR. Specifically, the following has been agreed in RAN2:

The current beam report agreements (network configures the UE to report beam identifier only, beam measurement result and identifier, or no beam reporting) applies to both event-triggered reports and periodical reports.

A single periodical measurement configuration can be configured to report SS based measured results or CSI-RS based measured results (not both).

The UE is required to report all applicable cell up to maxCellReport for periodical measurement, where the applicable cells are defined as any neighbour cells detected on the associated frequency except for the cell in black cell list.

Based on these agreements, the periodic measurement reports will be based on only one RSType that is configured in the corresponding reportConfig. Also, it has been agreed that the beam level measurements are also included in the measurement report.

In LTE, the triggerQuantity parameter, part of the reporting configuration (reportConfig), is not only used to indicate which quantity shall be used for event triggered reporting such as, for example, either RSRP, RSRQ or SINR. In addition, it may also be used for periodical reporting. In addition to this parameter, reportConfig also contains a parameter called reportQuantity, used to indicate which quantities shall be included in the measurement report. In other words, network may configure the UE to report more quantities than what is being used for triggering the event.

If the triggerQuantity is configured as RSRP and the reportQuantity is configured as sameAsTriggerQuantity, then the UE shall report the RSRP values. If the triggerQuantity is configured as RSRQ and the reportQuantity is configured as sameAsTriggerQuantity, then the UE shall report the RSRQ values. Additionally, the reportQuantity can be configured as both, leading to reporting of both RSRP and RSRQ. In Release-13, additional SINR based reporting were also introduced.

There currently exist certain challenge(s). Based on the above agreements for NR, the network may configure a UE to include beam level measurement information (i.e., only beam indexes or beam indexes with measurement result(s)) for periodic measurement reporting as well as event triggered measurement reports. It has already been agreed that the UE shall include the best beam for each cell and up to X-1 strongest beams per cell above an absolute threshold in the measurement report, where X is configured in reportConfig and the threshold in the measObject.

Additionally, the following has been argued to solve the problem and has been submitted to RAN2 #100 in R2-1713427, which discusses corrections on RRM TP:

The current TP, the UE derives each cell quantity by the best N beams for that quantity as below:

The UE shall:

1> for each cell measurement quantity to be derived based on SS/PBCH block;

2> if nroSS-BlocksToAverage in the associated measObject is not configured; or

2> if absThreshSS-BlocksConsolidation in the associated measObject is not configured; or 2> if the highest beam measurement quantity value is below absThreshSS-BlocksConsolidation:

3> derive each cell measurement quantity based on SS/PBCH block as the highest beam measurement quantity value, where each beam measurement quantity is described in TS 38.215 [FFS];
2> else:
3> derive each cell measurement quantity based on SS/PBCH block as the linear average of the power values of the highest beam measurement quantity values above absThreshSS-Blocks-Consolidation where the total number of averaged beams shall not exceed nroSS-Blocks-ToAverage;

If multiple cell qualities (for example RSRQ and RSRQ) are configured to report, the UE may have different sets of best N beams for cell derivation considering the best N beams for RSRP and RSRQ may be different. However, there has only one set of beams in measurement report, the current TP says the UE should include the best beam for each quantity, and other beams above the threshold in decreasing order, but it is unclear on how to sort these beams. If beams are sorted by different quantities (for example RSRP or RSRQ), the results would be different.

For beam measurement information to be included in a measurement report the UE shall:
1> set rsIndexResults to include up to maxNroRsIndexesToReport beam indexes in order of decreasing quantity as follows:
2> if the measurement information to be included is based on SS/PBCH block:
3> include within resultsSSBIndexes the index associated to the best beam for that SS/PBCH block quantity and the remaining beams whose quantity is above absThreshSS-BlocksConsolidation defined in the VarMeasConfig for the corresponding measObject;
3> if onlyReportBeamIds is not configured, include the SS/PBCH based measurement results associated to each beam index;

To clarify the beam raking criteria for beams report, one possible change is to sort the beams by the quantity triggered by the event, but it is still unclear on how to sort beams for periodical MR. another options is to indicate the quantity for beams sort explicitly by the network, in that case an additional configuration is needed to indicate the quantity for beam sort in MR.

Proposal 6: the network needs to indicate the measurement quantity for beam sort in measurement configuration if multiple quantities are configured to report.

Thus, as it can be seen, the R2-1713427 contribution mentioned a first solution where that 'triggerQuantity' could be used as the measurement quantity to be used for sorting the beam level measurements to be reported. As it has been mentioned in the prior art itself, the problem with that solution is that the triggerQuantity is defined only for event triggered in the NR RRC specifications, hence, it is ambiguous how the UE shall sort the beams to be included in measurement reports.

Then, the Contribution suggests a second solution where an explicit parameter indicates the UE how to sort the beams, some kind of beam sorting reporting parameter. While that solution can solve the problem, that is not the most efficient.

The problems with the second solution are that an extra parameter would have to be defined in the specification and explicitly signalled to the UE. Also, another problem is that it only covers the case of a single trigger quantity i.e. report is triggered based on a single quantity RSRP, RSRQ or SINR. In NR, it has been at least proposed that the network should potentially configure multiple trigger quantities such as, for example, RSRP and RSRQ; RSRQ and SINR; RSRP and SINR; RSRP, RSRQ and SINR. Also, it has been proposed that these could be based on multiple RS types, e.g., SS/PBCH block and CSI-RS.

Yet another problem relates to the following agreements in NR, related to beam reporting associated to the serving cells. Specifically, in RAN2 #99bis Prague, it has been agreed that beam level information (beam IDs and/or available measurement results) of the PCell/PSCell and SCell is included in the measurement report if the network has configured the UE to do so.

There is still an open question whether the UE always includes serving cells' beam information in measurement reports, although one of the alternatives might likely be supported:
UE shall include in measurement report all available beam measurement information for serving cell(s);
UE shall include in measurement report the available beam measurement information for serving cell(s) according to reportConfig associated to the report;

In other words, in LTE, UE shall include RSRP and RSRQ in measurement reports for each configured serving cell. That has also been agreed for NR. Hence, as for each frequency there is a single serving cell, there is no need to solve the sorting problem for serving cell measurement reporting. However, in NR, it has been agreed that the network may configure the UE to include beam measurement results associated to i) serving cells (PCell and SCell(s)) and the ii) best neighbor(s) in serving frequencies as discussed above. Hence, the solution(s) described in the prior contribution and agreements ignore that aspect of serving cell measurements, which is yet another limitation.

Yet another problem relates to the following agreements in NR, related to beam reporting associated to the best neighbor cell(s) in each serving frequency. In RAN2 #99bis Prague, it has been agreed that the network can configure the UE to report the best neighbour cells in the serving frequencies. The agreement from RAN2 #99bis meeting allows for the cell level measurements of the best neighbour cell in serving frequencies to be included. However, the RSType to be used to perform the neighbour cell measurements is still not agreed. Though one can configure a separate information element to control what type of RSType to be used for performing the neighbour cell measurements in the serving frequencies, it would be sufficient to have the same RSType as the one used for the serving cells' measurements. It has already been agreed that the RSType for the serving cells' measurement is same as the one configured in the reportConfigNR. There is a possibility that the following may be agreed in NR.
UE shall use the same RSType(s) to measure best neighbour cell in the serving frequencies as that of serving cells' measurements in those frequencies.

Like the RSType to be used for measuring the neighbour cell measurements in the serving frequencies, the quantities to be measured could also follow the same principles. It is beneficial to the network to have same quantity to be reported for the best neighbour cell and the serving cell in the serving frequencies so that the network can compare these measurements and take the decisions accordingly. As the RSRP and RSRQ measurements will always be reported for the serving cells, the same shall be applicable to the best neighbouring cells in those serving frequencies. The SINR reporting as mentioned in the previous section can be dependent on the contents of the report quantity of the measID that triggered the measurement report. Then, there is also a possibility that the following is also agreed in NR:

> UE shall use the same measurement quantity for reporting cell level measurements of best neighbour cell in the serving frequencies as that of serving cells' measurements in those frequencies.

The beam level information of the best neighbour cell in the serving frequencies is not always needed. In those cases when it is needed, the network can obtain the same by having specific events related to the same (e.g., A6 event). However, configuring additional A6 events just for the purpose of obtaining best neighbor cell beam level information in serving frequencies could lead to increase in the number of measurements as configured for the UE. In order to overcome this drawback, there could be a trade-off i.e. one could have the beam level information of the best neighbor cell in serving frequencies reported to the network only if the UE is configured with the beam level reporting is enabled in the reportConfig of the measID that triggered the measurement report. The following may also be agreed for NR:

> UE shall include the beam level measurements of the best neighbour cell in the serving frequencies in the measurement report only if the beam level reporting is enabled in the reportConfig of the measID that triggered the measurement report.

In order to further reduce the reporting overhead, the UE could report only those quantities that are configured in the beam level reporting related parameter in the reportConfig of the measID that triggered the measurement report.

> shall include only those beam level measurement quantities of the best neighbour cell in the serving frequencies that are configured in the beam level reporting of the reportConfig in the measID that triggered the measurement report.

In summary, beam level measurement information associated to best neighbor(s) in each serving frequency may also be configured by the network to be included by the UE in measurement reports. Hence, as that problem also did not exist in LTE or was not addressed by prior proposals, it still remains unsolved.

SUMMARY

Certain aspects of the present disclosure and their embodiments may provide solutions to these or other challenges. Particular embodiments propose a method to configure the user equipment (UE) to identify the quantity to be chosen for sorting the beam level measurements.

According to certain embodiments, a method performed by a wireless device for measurement reporting includes sorting a plurality of measurements for a measurement report based on at least one measurement quantity. The method further includes reporting, to a network node, measurement information selected from the plurality of measurements sorted based on the at least one measurement quantity.

According to certain embodiments, a wireless device for measurement reporting includes processing circuitry configured to sort a plurality of measurements for a measurement report based on at least one measurement quantity and report, to a network node, measurement information selected from the plurality of measurements based on the at least one measurement quantity.

According to certain embodiments, a method performed by a network node for configuring a wireless device for measurement reporting includes configuring the wireless device event-based measurement reporting and receiving, from the wireless device, a measurement report comprising measurement information selected from a plurality of measurements based on a sorting of the plurality of measurements in response to detection of an event.

According to certain embodiments, a network node for configuring a wireless device for measurement reporting includes processing circuitry configured to configure the wireless device for event-based measurement reporting and receive, from the wireless device, a measurement report comprising measurement information selected from a plurality of measurements based on a sorting of the plurality of measurements in response to detection of an event.

Certain embodiments may provide one or more of the following technical advantage(s). For example, certain embodiments may provide a standardized behaviour from the UE for sorting of the beams which enables the network to build clever self-optimized network (SON) functions.

BRIEF DESCRIPTION OF THE DRAWINGS

For a more complete understanding of the disclosed embodiments and their features and advantages, reference is now made to the following description, taken in conjunction with the accompanying drawings, in which:

FIG. 9 illustrates an example method implemented in a communication system, according to certain embodiments;

FIG. 10 illustrates another example method implemented in a communication system, according to certain embodiments;

DETAILED DESCRIPTION

Figure 1:
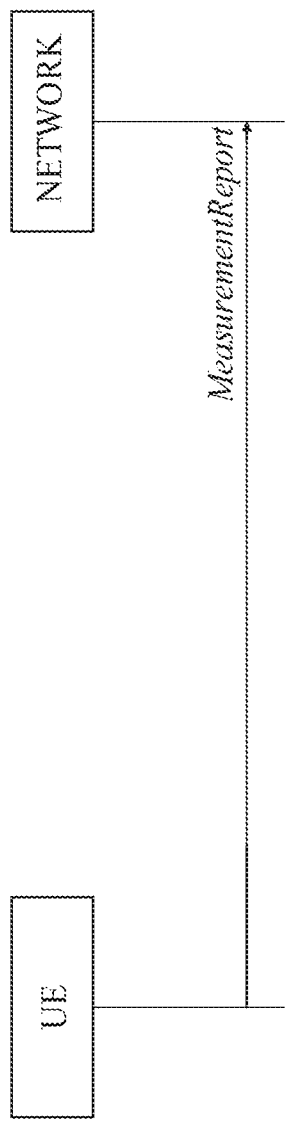
FIG. 1 illustrates a measurement reporting procedure, according to certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The following embodiments are applicable for cell and beam level measurement reporting at least in i) periodic measurement reporting including beam measurement information, ii) event triggered measurement reporting including beam measurement information.

In the case of event triggered measurement reporting, certain embodiments may assume the following cases for the problem of sorting the beam measurement information and cells based on these cases:

Single trigger quantity based on single RS type:
  RSRP, RSRQ or SINR; Any of them based on SS/PBCH block;
  RSRP, RSRQ or SINR; Any of them based on CSI-RS;
Single trigger quantity based on multiple RS types:
  RSRP, RSRQ or SINR; There can be the same trigger quantity measured with different RS types.
    For example, event could be configured to be triggered based on two RSRP values, one measured based on SS/PBCH block and another based on CSI-RS.
    For example, event could be configured to be triggered based on two RSRQ values, one measured based on SS/PBCH block and another based on CSI-RS.
    For example, event could be configured to be triggered based on two SINR values, one measured based on SS/PBCH block and another based on CSI-RS.
  RSRP, RSRQ or SINR; Any of them based on CSI-RS;
Multiple trigger quantities based on single RS type per event:
  RSRP and RSRQ; RSRP and SINR; RSRQ and SINR; RSRP, RSRQ and SINR; All based on SS/PBCH block.
  RSRP and RSRQ; RSRP and SINR; RSRQ and SINR; RSRP, RSRQ and SINR; All based on CSI-RS.
Multiple trigger quantities based on multiple RS types per event:
  RSRP based on SS/PBCH block and RSRQ based on CSI-RS;
  RSRP based on CSI-RS and RSRQ based on SS/PBCH block;
  RSRP based on SS/PBCH block and SINR based on CSI-RS;
  RSRP based on CSI-RS and SINR based on SS/PBCH block;
  RSRQ based on SS/PBCH block and SINR based on CSI-RS;
  RSRQ based on CSI-RS and SINR based on SS/PBCH block;
  RSRP, RSRQ and SINR, based on any combinations of RS types. For example, RSRP and RSRQ based on SS/PBCH block while SINR based on CSI-RS. In another example, RSRP and SINR based on SS/PBCH block while RSRQ based on CSI-RS.

According to certain embodiments, the network may configure different beam and cell level measurement information. For example, the network may configure the UE to report the following measurement information based on SS/PBCH block(s):
  Measurement results per SS/PBCH block, per cell and/or beam;
  SS/PBCH block(s) indexes (i.e. per beam when SS/PBCH blocks are beamformed and configured for measurements).

The network may configure the UE to report the following measurement information based on CSI-RS resources:
  Measurement results per CSI-RS resource, per cell and/or per beam.
  CSI-RS resource measurement identifiers.

According to certain embodiments, a single parameter, which may be called a triggerQuantity, is defined in reportConfig as a multi-purpose parameter and defined for multiple event types.

In a particular embodiment, for example, the single parameter called triggerQuantity may be defined in reportConfig for event triggered report type and periodical report type as a common parameter. The parameter triggerQuantity may be defined in reportConfig can be encoded as followed triggerQuantity::=ENUMERATED {rsrp, rsrq, sinr}.

Below are some examples of how that common parameter could be coded in ASN.1. For example, triggerQuantity can be valid for multiple report types e.g. periodical or event-Triggered and coded outside reportType, as shown below:

| ReportConfigNR information element |
|---|
| -- ASN1START<br>-- TAG-REPORT-CONFIG-START<br>ReportConfigNR ::=    SEQUENCE {<br>   reportType        CHOICE { |

-continued

| ReportConfigNR information element |
|---|

```
            periodical              PeriodicalReportConfig,
            eventTriggered          EventTriggerConfig,
            reportCGI               Type_FFS!,
            ...
        },
        triggerQuantity             ENUMERATED {rsrp, rsrq, sinr}
}
EventTriggerConfig::=               SEQUENCE {
    eventId                             CHOICE {
        eventA1                             SEQUENCE {
            a1-Threshold                        MeasTriggerQuantity,
            reportOnLeave                       BOOLEAN,
            hysteresis                          Hysteresis,
            timeToTrigger                       TimeToTrigger
        },
        eventA2                             SEQUENCE {
            a2-Threshold                        MeasTriggerQuantity,
            reportOnLeave                       BOOLEAN,
            hysteresis                          Hysteresis,
            timeToTrigger                       TimeToTrigger
        },
        eventA3                             SEQUENCE {
            a3-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
                OPTIONAL
        },
        eventA4                             SEQUENCE {
            a4-Threshold                        MeasTriggerQuantity,
            reportOnLeave                       BOOLEAN,
            hysteresis                          Hysteresis,
            timeToTrigger                       TimeToTrigger,
            useWhiteCellList                    BOOLEAN
                OPTIONAL
        },
        eventA5                             SEQUENCE {
            a5-Threshold1                       MeasTriggerQuantity,
            a5-Threshold2                       MeasTriggerQuantity,
            reportOnLeave                       BOOLEAN,
            hysteresis                          Hysteresis,
            timeToTrigger                       TimeToTrigger,
            useWhiteCellList                    BOOLEAN
                OPTIONAL
        },
        eventA6                             SEQUENCE {
            a6-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
                OPTIONAL
        },
    },
    rsType                              ENUMERATED {ss, csi-rs},
    reportInterval                      ReportInterval,
    reportAmount                        ENUMERATED {FFS!},
        reportQuantityCell                  MeasReportQuantity,
    maxReportCells                      INTEGER (1..maxCellReport),
    reportQuantityRsIndexes             MeasReportQuantity
        OPTIONAL,
    maxNroRsIndexesToReport     INTEGER (1..maxNroIndexesToReport)
            OPTIONAL,
    onlyReportBeamIds                   BOOLEAN
                OPTIONAL
    reportAddNeighMeas                  TYPE_FFS!
}
PeriodicalReportConfig ::=          SEQUENCE {
    rsType                              ENUMERATED {ss, csi-rs},
    reportInterval                      ReportInterval,
    reportAmount                        ENUMERATED {FFS!},
    reportQuantityCell                  MeasReportQuantity,
    maxReportCells                      INTEGER (1..maxCellReport),
    reportQuantityRsIndexes             MeasReportQuantity
        OPTIONAL,
    maxNroRsIndexesToReport             INTEGER (1..maxNroIndexesToReport)
```

| ReportConfigNR information element |
| --- |

```
                            OPTIONAL,
    onlyReportBeamIds                       BOOLEAN
                            OPTIONAL
}
MeasTriggerQuantity::=                      CHOICE {
    rsrp                                        RSRPRange,
    rsrq                                        RSRQRange,
    sinr                                        SINRRange
}
MeasTriggerQuantityOffset::=                CHOICE {
    rsrp                                        INTEGER (FFS!) OPTIONAL,
    rsrq                                        INTEGER (FFS!) OPTIONAL,
    sinr                                        INTEGER (FFS!) OPTIONAL
}
MeasReportQuantity::=                       SEQUENCE {
    rsrp                                        BOOLEAN,
    rsrq                                        BOOLEAN,
    sinr                                        BOOLEAN
}
M
-- TAG-REPORT-CONFIG-START
-- ASN1STOP
```

According to other embodiments, the same multi-purpose parameter triggerQuantity can be encoded within each reportType that it is mean to be used such as periodical or eventTriggered, as shown below:

| ReportConfigNR information element |
| --- |

```
-- ASN1START
-- TAG-REPORT-CONFIG-START
ReportConfigNR ::=                          SEQUENCE {
    reportType                                  CHOICE {
        periodical                                  PeriodicalReportConfig,
        eventTriggered                              EventTriggerConfig,
        reportCGI                                   TYPE_FFS!,
        ...
    }
}
EventTriggerConfig::=                       SEQUENCE {
    eventId                                     CHOICE {
        eventA1                                     SEQUENCE {
            a1-Threshold                                MeasTriggerQuantity,
            reportOnLeave                               BOOLEAN,
            hysteresis                                  Hysteresis,
            timeToTrigger                               TimeToTrigger
        },
        eventA2                                     SEQUENCE {
            a2-Threshold                                MeasTriggerQuantity,
            reportOnLeave                               BOOLEAN,
            hysteresis                                  Hysteresis,
            timeToTrigger                               TimeToTrigger
        },
        eventA3                                     SEQUENCE {
            a3-Offset                                   MeasTriggerQuantityOffset,
            reportOnLeave                               BOOLEAN,
            hysteresis                                  Hysteresis,
            timeToTrigger                               TimeToTrigger,
            useWhiteCellList                            BOOLEAN
                            OPTIONAL
        },
        eventA4                                     SEQUENCE {
            a4-Threshold                                MeasTriggerQuantity,
            reportOnLeave                               BOOLEAN,
            hysteresis                                  Hysteresis,
            timeToTrigger                               TimeToTrigger,
            useWhiteCellList                            BOOLEAN
                            OPTIONAL
        },
        eventA5                                     SEQUENCE {
            a5-Threshold1                               MeasTriggerQuantity,
            a5-Threshold2                               MeasTriggerQuantity,
            reportOnLeave                               BOOLEAN,
            hysteresis                                  Hysteresis,
            timeToTrigger                               TimeToTrigger,
```

| ReportConfigNR information element |  |
|---|---|
|         useWhiteCellList<br>            OPTIONAL<br>    },<br>    eventA6<br>        a6-Offset<br>        reportOnLeave<br>        hysteresis<br>        timeToTrigger<br>        useWhiteCellList<br>            OPTIONAL<br>    },<br>},<br>rsType<br>reportInterval<br>reportAmount<br>triggerQuantity<br>reportQuantityCell<br>maxReportCells<br>reportQuantityRsIndexes<br>    OPTIONAL,<br>maxNroRsIndexesToReport<br>OPTIONAL,<br>onlyReportBeamIds<br>        OPTIONAL<br>reportAddNeighMeas<br>}<br>PeriodicalReportConfig ::=<br>    rsType<br>    reportInterval<br>    reportAmount<br>    triggerQuantity<br>    reportQuantityCell<br>    maxReportCells<br>    reportQuantityRsIndexes<br>    OPTIONAL,<br>    maxNroRsIndexesToReport<br>1..maxNroIndexesToReport)<br>        OPTIONAL,<br>    onlyReportBeamIds<br>        OPTIONAL<br>}<br>MeasTriggerQuantity::=<br>    rsrp<br>    rsrq<br>    sinr<br>}<br>MeasTriggerQuantityOffset::=<br>    rsrp<br>    OPTIONAL,<br>    rsrq<br>    OPTIONAL,<br>    sinr<br>}<br>MeasReportQuantity::=<br>    rsrp<br>    rsrq<br>    sinr<br>}<br>M | BOOLEAN<br><br><br>SEQUENCE {<br>    MeasTriggerQuantityOffset,<br>    BOOLEAN,<br>    Hysteresis,<br>    TimeToTrigger,<br>    BOOLEAN<br><br><br><br>ENUMERATED {ss, csi-rs},<br>ReportInterval,<br>ENUMERATED {FFS!},<br>ENUMERATED {rsrp, rsrq, sinr}<br>MeasReportQuantity,<br>    INTEGER (1..maxCellReport),<br>MeasReportQuantity<br><br>INTEGER (1..maxNroIndexesToReport)<br><br>BOOLEAN<br><br>TYPE_FFS!<br><br>SEQUENCE {<br>ENUMERATED {ss, csi-rs},<br>ReportInterval,<br>ENUMERATED {FFS!},<br>ENUMERATED {rsrp, rsrq, sinr}<br>MeasReportQuantity,<br>    INTEGER (1..maxCellReport),<br>MeasReportQuantity<br><br>INTEGER<br><br><br>BOOLEAN<br><br><br>CHOICE {<br>    RSRPRange,<br>    RSRQRange,<br>    SINRRange<br><br>CHOICE {<br>    INTEGER (FFS!)<br><br>    INTEGER (FFS!)<br><br>    INTEGER (FFS!)    OPTIONAL<br><br>SEQUENCE {<br>    BOOLEAN,<br>    BOOLEAN,<br>    BOOLEAN<br> |

According to certain other embodiments, the parameter for event triggered report type within each event is encoded, as it might not be applicable for other events to be introduced in the future, as shown below:

| ReportConfigNR information element |  |
|---|---|
| ReportConfigNR ::=<br>    reportType<br>        periodical<br>        eventTriggered<br>        reportCGI<br>        ...<br>    }<br>} | SEQUENCE {<br>    CHOICE {<br>        PeriodicalReportConfig,<br>        EventTriggerConfig,<br>        TYPE_FFS!, |

-continued

| ReportConfigNR information element |
|---|

```
EventTriggerConfig::=                SEQUENCE {
    eventId                          CHOICE {
        eventA1                      SEQUENCE{
            a1-Threshold                 MeasTriggerQuantity,
            reportOnLeave                BOOLEAN,
            hysteresis                   Hysteresis,
            timeToTrigger                TimeToTrigger,
            triggerQuantity              ENUMERATED {rsrp, rsrq, sinr}
        },
        eventA2                      SEQUENCE {
            a2-Threshold                 MeasTriggerQuantity,
            reportOnLeave                BOOLEAN,
            hysteresis                   Hysteresis,
            timeToTrigger                TimeToTrigger,
            triggerQuantity              ENUMERATED {rsrp, rsrq, sinr}
        },
        eventA3                      SEQUENCE {
            a3-Offset                    MeasTriggerQuantityOffset,
            reportOnLeave                BOOLEAN,
            hysteresis                   Hysteresis,
            timeToTrigger                TimeToTrigger,
            useWhiteCellList             BOOLEAN
                                         OPTIONAL,
            triggerQuantity              ENUMERATED {rsrp, rsrq, sinr}
        },
        eventA4                      SEQUENCE {
            a4-Threshold                 MeasTriggerQuantity,
            reportOnLeave                BOOLEAN,
            hysteresis                   Hysteresis,
            timeToTrigger                TimeToTrigger,
            useWhiteCellList             BOOLEAN
                                         OPTIONAL,
            triggerQuantity              ENUMERATED {rsrp, rsrq, sinr}
        },
        eventA5                      SEQUENCE {
            a5-Threshold1                MeasTriggerQuantity,
            a5-Threshold2                MeasTriggerQuantity,
            reportOnLeave                BOOLEAN,
            hysteresis                   Hysteresis,
            timeToTrigger                TimeToTrigger,
            useWhiteCellList             BOOLEAN
                                         OPTIONAL,
            triggerQuantity              ENUMERATED {rsrp, rsrq, sinr}
        },
        eventA6                      SEQUENCE {
            a6-Offset                    MeasTriggerQuantityOffset,
            reportOnLeave                BOOLEAN,
            hysteresis                   Hysteresis,
            timeToTrigger                TimeToTrigger,
            useWhiteCellList             BOOLEAN
                                         OPTIONAL,
            triggerQuantity              ENUMERATED {rsrp, rsrq, sinr}
        },
    },
    rsType                           ENUMERATED {ss, csi-rs},
    reportInterval                   ReportInterval,
    reportAmount                     ENUMERATED {FFS!},
    reportQuantityCell               MeasReportQuantity,
    maxReportCells                   INTEGER (1..maxCellReport),
    reportQuantityRsIndexes          MeasReportQuantity
    OPTIONAL,
    maxNroRsIndexesToReport   INTEGER (1..maxNroIndexesToReport)
    OPTIONAL,
    onlyReportBeamIds                BOOLEAN
                                     OPTIONAL
    reportAddNeighMeas               TYPE_FFS!
}
PeriodicalReportConfig ::=           SEQUENCE {
    rsType                           ENUMERATED {ss, csi-rs},
    reportInterval                   ReportInterval,
    reportAmount                     ENUMERATED {FFS!},
```

-continued

| ReportConfigNR information element | |
|---|---|
| triggerQuantity | ENUMERATED {rsrp, rsrq, sinr} |
| reportQuantityCell | MeasReportQuantity, |
| maxReportCells | INTEGER (1..maxCellReport), |
| reportQuantityRsIndexes | MeasReportQuantity |
| OPTIONAL, | |
| maxNroRsIndexesToReport | INTEGER (1..maxNroIndexesToReport) |
| OPTIONAL, | |
| onlyReportBeamIds | BOOLEAN |
| OPTIONAL | |
| } | |
| MeasTriggerQuantity::= | CHOICE { |
| rsrp | RSRPRange, |
| rsrq | RSRQRange, |
| sinr | SINRRange |
| } | |
| MeasTriggerQuantityOffset::= | CHOICE { |
| rsrp | INTEGER (FFS!) |
| OPTIONAL, | |
| rsrq | INTEGER (FFS!) |
| OPTIONAL, | |
| sinr | INTEGER (FFS!)        OPTIONAL |
| } | |
| MeasReportQuantity::= | SEQUENCE { |
| rsrp | BOOLEAN, |
| rsrq | BOOLEAN, |
| sinr | BOOLEAN |
| } | |
| M | |
| -- TAG-REPORT-CONFIG-START | |
| -- ASN1STOP | |

According to certain embodiments, UE actions may be taken depending on the parameter value in reportConfig for a measurement identifier (measId), which can be: 'rsrp', 'rsrq' or 'sinr'. As examples, the UE shall:

If event triggered report type is configured and if beam reporting is configured for that event or,
If periodical report type is configured and if beam reporting is configured for that report type:
    UE shall sort neighbor cell measurement results to be included in measurement reports based on the configured value i.e. if network configures 'rsrp', both cell measurement results and beam measurement information are sorted based on RSRP measurements (cell RSRP values and L3 filtered beam RSRP values, either based on SS/PBCH block or CSI-RS).
If periodical report type is configured and if beam reporting is configured for that report type:
    UE shall assume the configured parameter as the trigger quantity for that configured event i.e. RSRP, RSRQ or SINR.
When the UE is to include for configured serving cell(s) beam measurement information, there can be multiple beams per cell and sorting is needed. Hence, the UE shall:
    If the beams to be reported have measurements associated to only one RS type, set the measResult to include the quantity(ies) indicated in the reportQuantity within the concerned reportConfig in order of decreasing triggerQuantity, i.e. the best beam associated to the triggerQuantity for the available RS type is included first;
When the UE is to include for configured best neighbor(s) in each serving frequency, beam measurement information, there can be multiple beams per best neighbor cell and sorting is needed. Hence, the UE shall:
    If the beams to be reported have measurements associated to only one RS type, set the measResult to include the quantity(ies) indicated in the reportQuantity within the concerned reportConfig in order of decreasing triggerQuantity, i.e. the best beam associated to the triggerQuantity for the available RS type is included first;

According to certain embodiments, the parameter may be said to be multi-purpose in the sense that it is also used to indicate the ordering to include beam measurement information associated to the serving cell(s) and best neighbor(s) in serving frequency(ies) in measurement reports, i.e., ordered by RSRP, RSRQ or SNIR.

In another embodiment, the existing parameter rsType in reportConfig, which can take values SS/PBCH block or CSI-RS, is also multi-purpose. As defined in the current 38.331DRAFT specifications, the parameter is only used for selecting which RS type should be used for neighbor measurements associated to that report type. As proposed in this embodiment, it shall be used, in addition, for additional UE actions related to sorting beams associated to serving cells to include in measurement reports.

If event triggered report type is configured or,
If periodical report type is configured,
    If the beams associated to configured serving cell(s) to be reported have measurements associated to multiple RS type(s), e.g. SS/PBCH block and CSI-RS, set the measResult to include the quantity(ies) indicated in the reportQuantity within the concerned reportConfig in order of decreasing triggerQuantity associated to the same rsType in reportConfig that triggered the report i.e. the best beam associated to the triggerQuantity measured using the configured rsType is included first; In other words, let us assume that the UE has available beam measurement information (e.g. both RSRP and RSRQ) associated to CSI-RS and SS/PBCH blocks (SSB). Then, if triggerQuantity is rsrp, sorting shall occur based on RSRP. However, there can be two RSRP values, one based on SSB and another based on CSI-RS. The one to be used as sorting criteria shall be SSB if rsType in reportConfig is SSB. Else, the one to be used as sorting criteria shall be CSI-RS if rsType in reportConfig is CSI-RS;

When the UE is to include for configured best neighbor(s) in each serving frequency, beam measurement information, the notion of the "best" cell or cells may vary depending on the quantity (best RSRP? Best RSRQ?best SINR?) and RS type (best according to SSB? Best according to CSI-RS?). Hence, in the case the UE has available multiple of these measurements and shall include the K best cell(s) only the UE shall:

If the best cells in configured serving frequency(ies) to be reported have measurements associated to multiple RS type(s), e.g. SS/PBCH block and CSI-RS, set the measResult to include the quantity(ies) indicated in the reportQuantity within the concerned reportConfig in order of decreasing triggerQuantity associated to the same rsType in reportConfig that triggered the report i.e. the best cell associated to the triggerQuantity measured using the configured rsType is included first; In other words, let us assume that the UE has available cell measurements (e.g. both RSRP and RSRQ) associated to CSI-RS and SS/PBCH blocks (SSB). Then, if triggerQuantity is rsrp, sorting shall occur based on RSRP. However, there can be two RSRP values, one based on SSB and another based on CSI-RS. The one to be used as sorting criteria shall be SSB if rsType in reportConfig is SSB. Else, the one to be used as sorting criteria shall be CSI-RS if rsType in reportConfig is CSI-RS;

If the best beams of best cell(s) in configured serving frequency(ies) to be reported have measurements associated to multiple RS type(s), e.g. SS/PBCH block and CSI-RS, set the measResult to include the quantity(ies) indicated in the reportQuantity within the concerned reportConfig in order of decreasing triggerQuantity associated to the same rsType in reportConfig that triggered the report i.e. the best cell associated to the triggerQuantity measured using the configured rsType is included first; In other words, let us assume that the UE has available cell measurements (e.g. both RSRP and RSRQ) associated to CSI-RS and SS/PBCH blocks (SSB). Then, if triggerQuantity is rsrp, sorting shall occur based on RSRP. However, there can be two RSRP values, one based on SSB and another based on CSI-RS. The one to be used as sorting criteria shall be SSB if rsType in reportConfig is SSB. Else, the one to be used as sorting criteria shall be CSI-RS if rsType in reportConfig is CSI-RS;

If the beams to be reported have measurements associated to multiple RS type(s), e.g. SS/PBCH block and CSI-RS, set the measResult to include the quantity(ies) indicated in the reportQuantity within the concerned reportConfig in order of decreasing triggerQuantity associated to the same rsType in reportConfig i.e. the best beam associated to the triggerQuantity measured using the configured rsType is included first.

FIG. 1 illustrates a measurement reporting procedure, according to certain embodiments. With regard to the measurement reporting procedure, procedural text could be written for NR RRC specifications 38.331 as follows:

The purpose of this procedure is to transfer measurement results from the UE to the network. The UE shall initiate this procedure only after successful security activation.

For the measId for which the measurement reporting procedure was triggered, the UE shall set the measResults within the MeasurementReport message as follows:

1> set the measId to the measurement identity that triggered the measurement reporting;

1> set the measResultServingCell within measResultServingFreqList to include the all available cell and beam quantities of the PCell based on SS/PBCH block and CSI-RS measurements;

1> set the measResultServingCell within measResultServFreqList to include for each SCell that is configured, if any, the servFreqId and all the available cell and beam quantities of the concerned SCell based on SS/PBCH block and CSI-RS measurements, if available according to performance requirements in TS 38.133;

1> if the reportConfig associated with the measId that triggered the measurement reporting includes reportAddNeighMeas:

2> for each serving frequency for which measObjectId is referenced in the measIdList, other than the frequency corresponding with the measId that triggered the measurement reporting:

3> set the measResultBestNeighCell within measResultServFreqList to include the physCellId and the quantities of the best non-serving cell on the concerned serving frequency;

[Details of the information to be reported concerning best neighbouring cells in the serving frequencies e.g. which RS type, which quantities, whether beam reporting is supported, etc. are for future study. Additionally, whether the UE shall include all available beam information of the PCell/SCells in a measurement report or whether the UE shall only include the beam information of PCell/PSCell that is indicated in the reportConfig associated to that measId are for future study.]

1> if there is at least one applicable neighbouring cell to report:

2> set the measResultNeighCells to include the best neighbouring cells up to maxReportCells in accordance with the following:

3> if the reportType is set to eventTriggered:

4> include the cells included in the cellsTriggeredList as defined within the VarMeasReportList for this measId;

3> else:

4> include the applicable cells for which the new measurement results became available since the last periodical reporting or since the measurement was initiated or reset;

4> if reportQuantityRsIndexes is configured, include beam measurement information as described in 5.5.5.1;

3> for each cell that is included in the measResultNeighCells, include the physCellId;

3> if the reportType is set to eventTriggered;

4> for each included cell, include the layer 3 filtered measured results in accordance with the reportConfig for this measId, ordered as follows:

5> if the measObject associated with this measId concerns NR:
6> if rsType in the associated reportConfig is set to ss:
> set resultsSSBCell within the measResult to include the SS/PBCH block based quantity(ies) indicated in the reportQuantityCell within the concerned reportConfig, in order of decreasing quantity indicated in the triggerQuantity parameter, i.e. the best cell is included first;
> if reportQuantityRsIndexes is configured, include beam measurement information as described in 5.5.5.1;
6> if
6> if rsType in the associated reportConfig is set to csi-rs:
7> set resultsCSI-RSCell within the measResult to include the CSI-RS based quantity(ies) indicated in the reportQuantityCell within the concerned reportConfig, in order of decreasing quantity indicated in the triggerQuantity parameter, i.e. the best cell is included first;
8> if reportQuantityRsIndexes is configured, include beam measurement information as described in 5.5.5.1;
1> increment the numberOfReportsSent as defined within the VarMeasReportList for this measId by 1;
1> stop the periodical reporting timer, if running;
1> if the numberOfReportsSent as defined within the VarMeasReportList for this measId is less than the reportAmount as defined within the corresponding reportConfig for this measId:
2> start the periodical reporting timer with the value of reportInterval as defined within the corresponding reportConfig for this measId;
1> else:
2> if the reportType is set to periodical:
3> remove the entry within the VarMeasReportList for this measId;
3> remove this measId from the measIdList within VarMeasConfig;
1> submit the MeasurementReport message to lower layers for transmission, upon which the procedure ends;

5.5.5.1 Reporting of Beam Measurement Information
For beam measurement information to be included in a measurement report associated to neighbour the UE shall:
1> if the measurement information to be included is associated to serving cell(s) and both SS/PBCH block and CSI-RS measurements are available, consider the beam ordering to be based on measurements performed on the rsType configured in reportConfig;
1> if the measurement information to be included is associated to best neighbour cell(s) in the serving frequency(ies) and both SS/PBCH block and CSI-RS measurements are available, consider the beam ordering to be based on measurements performed on the rsType configured in reportConfig;
1> set rsIndexResults to include up to maxNroRsIndexesToReport beam indexes in order of decreasing quantity indicated in the triggerQuantity parameter as follows:
2> if the measurement information to be included is based on SS/PBCH block:
3> include within resultsSSBIndexes the index associated to the best beam for that SS/PBCH block quantity and the remaining beams whose quantity is above absThreshSS-BlocksConsolidation defined in the VarMeasConfig for the corresponding measObject;
3> if onlyReportBeamIds is not configured, include the SS/PBCH based measurement results associated to each beam index;
2> if the beam measurement information to be included is based on CSI-RS:
3> include within resultsCSI-RSIndexes the index associated to the best beam for that CSI-RS quantity and the remaining beams whose quantity is above absThreshCSI-RS-Consolidation defined in the VarMeasConfig for the corresponding measObject;
3> if onlyReportBeamIds is not configured, include the CSI-RS based measurement results associated to each beam index;

According to certain other embodiments, the single parameter called triggerQuantity may be defined in reportConfig for event triggered report type and periodical report type as a common parameter. The parameter triggerQuantity is defined in reportConfig can be encoded as follows:

```
triggerQuantity ::= SEQUENCE {
    rsrp                BOOLEAN,
    rsrq                BOOLEAN,
    sinr                BOOLEAN
}.
```

Hence, the previous set of embodiments are applicable if the network configures a single trigger quantity i.e. if only one quantity is selected (i.e. set to TRUE) and all remaining are set to FALSE.

Below we show some examples of how that common parameter could be coded in ASN.1. For example, triggerQuantity can be valid for multiple report types e.g. periodical or eventTriggered and coded outside reportType, as shown below:

ReportConfigNR information element

```
-- ASN1START
-- TAG-REPORT-CONFIG-START
ReportConfigNR ::=              SEQUENCE {
    reportType                      CHOICE {
        periodical                      PeriodicalReportConfig,
        eventTriggered                  EventTriggerConfig,
        reportCGI                       TYPE_FFS!,
        ...
    },
    triggerQuantity                 SEQUENCE {
        rsrp                            BOOLEAN,
```

| ReportConfigNR information element |
| --- |

```
        rsrq                            BOOLEAN,
        sinr                            BOOLEAN
    }
}
EventTriggerConfig::=               SEQUENCE {
    eventId                             CHOICE {
        eventA1                             SEQUENCE{
            a1-Threshold                        MeasTriggerQuantity,
            reportOnLeave                       BOOLEAN,
            hysteresis                          Hysteresis,
            timeToTrigger                       TimeToTrigger
        },
        eventA2                             SEQUENCE {
            a2-Threshold                        MeasTriggerQuantity,
            reportOnLeave                       BOOLEAN,
            hysteresis                          Hysteresis,
            timeToTrigger                       TimeToTrigger
        },
        eventA3                             SEQUENCE {
            a3-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
                    OPTIONAL
        },
        eventA4                             SEQUENCE {
            a4-Threshold                        MeasTriggerQuantity,
            reportOnLeave                       BOOLEAN,
            hysteresis                          Hysteresis,
            timeToTrigger                       TimeToTrigger,
            useWhiteCellList                    BOOLEAN
                    OPTIONAL
        },
        eventA5                             SEQUENCE {
            a5-Threshold1                       MeasTriggerQuantity,
            a5-Threshold2                       MeasTriggerQuantity,
            reportOnLeave                       BOOLEAN,
            hysteresis                          Hysteresis,
            timeToTrigger                       TimeToTrigger,
            useWhiteCellList                    BOOLEAN
                    OPTIONAL
        },
        eventA6                             SEQUENCE {
            a6-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
                    OPTIONAL
        },
    },
    rsType                              ENUMERATED {ss, csi-rs},
    reportInterval                      ReportInterval,
    reportAmount                        ENUMERATED {FFS!},
    reportQuantityCell                  MeasReportQuantity,
    maxReportCells                      INTEGER (1..maxCellReport),
    reportQuantityRsIndexes             MeasReportQuantity
        OPTIONAL,
    maxNroRsIndexesToReport         INTEGER (1..maxNroIndexesToReport)
        OPTIONAL,
    onlyReportBeamIds                   BOOLEAN
            OPTIONAL
    reportAddNeighMeas              TYPE_FFS!
}
PeriodicalReportConfig ::=          SEQUENCE {
    rsType                              ENUMERATED {ss, csi-rs},
    reportInterval                      ReportInterval,
    reportAmount                        ENUMERATED {FFS!},
    reportQuantityCell                  MeasReportQuantity,
    maxReportCells                      INTEGER (1..maxCellReport),
    reportQuantityRsIndexes             MeasReportQuantity
        OPTIONAL,
    maxNroRsIndexesToReport         INTEGER (1..maxNroIndexesToReport)
                OPTIONAL,
    onlyReportBeamIds                   BOOLEAN
            OPTIONAL
```

| ReportConfigNR information element |
| --- |

```
}
MeasTriggerQuantity::=          CHOICE {
    rsrp                            RSRPRange,
    rsrq                            RSRQRange,
    sinr                            SINRRange
}
MeasTriggerQuantityOffset::=    CHOICE {
    rsrp                            INTEGER (FFS!)    OPTIONAL,
    rsrq                            INTEGER (FFS!)    OPTIONAL,
    sinr                            INTEGER (FFS!)    OPTIONAL
}
MeasReportQuantity::=           SEQUENCE {
    rsrp                            BOOLEAN,
    rsrq                            BOOLEAN,
    sinr                            BOOLEAN
}
M
-- TAG-REPORT-CONFIG-START
-- ASN1STOP
```

In another example, the same multi-purpose parameter triggerQuantity can be encoded within each reportType that it is mean to be used such as periodical or eventTriggered, as shown below:

| ReportConfigNR information element |
| --- |

```
-- ASN1START
-- TAG-REPORT-CONFIG-START
ReportConfigNR ::=              SEQUENCE {
    reportType                      CHOICE {
        periodical                      PeriodicalReportConfig,
        eventTriggered                  EventTriggerConfig,
        reportCGI                       TYPE_FFS!,
        ...
    }
}
EventTriggerConfig::=           SEQUENCE {
    eventId                         CHOICE {
        eventA1                         SEQUENCE {
            a1-Threshold                    MeasTriggerQuantity,
            reportOnLeave                   BOOLEAN,
            hysteresis                      Hysteresis,
            timeToTrigger                   TimeToTrigger
        },
        eventA2                         SEQUENCE {
            a2-Threshold                    MeasTriggerQuantity,
            reportOnLeave                   BOOLEAN,
            hysteresis                      Hysteresis,
            timeToTrigger                   TimeToTrigger
        },
        eventA3                         SEQUENCE {
            a3-Offset                       MeasTriggerQuantityOffset,
            reportOnLeave                   BOOLEAN,
            hysteresis                      Hysteresis,
            timeToTrigger                   TimeToTrigger,
            useWhiteCellList                BOOLEAN
                OPTIONAL
        },
        eventA4                         SEQUENCE {
            a4-Threshold                    MeasTriggerQuantity,
            reportOnLeave                   BOOLEAN,
            hysteresis                      Hysteresis,
            timeToTrigger                   TimeToTrigger,
            useWhiteCellList                BOOLEAN
                OPTIONAL
        },
        eventA5                         SEQUENCE {
            a5-Threshold1                   MeasTriggerQuantity,
            a5-Threshold2                   MeasTriggerQuantity,
            reportOnLeave                   BOOLEAN,
            hysteresis                      Hysteresis,
            timeToTrigger                   TimeToTrigger,
            useWhiteCellList                BOOLEAN
```

| ReportConfigNR information element |
| --- |

```
                    OPTIONAL
        },
        eventA6                         SEQUENCE {
            a6-Offset                       MeasTriggerQuantityOffset,
            reportOnLeave                   BOOLEAN,
            hysteresis                      Hysteresis,
            timeToTrigger                   TimeToTrigger,
            useWhiteCellList                BOOLEAN
                    OPTIONAL
        },
    },
    rsType                          ENUMERATED {ss, csi-rs},
    reportInterval                  ReportInterval,
    reportAmount                    ENUMERATED {FFS!},
    triggerQuantity                 SEQUENCE {
        rsrp                            BOOLEAN,
        rsrq                            BOOLEAN,
        sinr                            BOOLEAN
    }
    -- Cell reporting configuration
    reportQuantityCell              MeasReportQuantity,
    maxReportCells                  INTEGER (1..maxCellReport),
    -- RS index reporting configuration
    reportQuantityRsIndexes         MeasReportQuantity
        OPTIONAL,
    maxNroRsIndexesToReport   INTEGER (1..maxNroIndexesToReport)
        OPTIONAL,
    onlyReportBeamIds               BOOLEAN
            OPTIONAL
    reportAddNeighMeas              TYPE_FFS!
}
PeriodicalReportConfig ::=          SEQUENCE {
    rsType                          ENUMERATED {ss, csi-rs},
    reportInterval                  ReportInterval,
    reportAmount                    ENUMERATED {FFS!},
    triggerQuantity                 SEQUENCE {
        rsrp                            BOOLEAN,
        rsrq                            BOOLEAN,
        sinr                            BOOLEAN
    }
    reportQuantityCell              MeasReportQuantity,
    maxReportCells                  INTEGER (1..maxCellReport),
    reportQuantityRsIndexes         MeasReportQuantity
        OPTIONAL,
    maxNroRsIndexesToReport         INTEGER (1..maxNroIndexesToReport)
                        OPTIONAL,
    onlyReportBeamIds           BOOLEAN
                        OPTIONAL,
}
MeasTriggerQuantity::=          CHOICE {
    rsrp                            RSRPRange,
    rsrq                            RSRQRange,
    sinr                            SINRRange
}
MeasTriggerQuantityOffset::=    CHOICE {
    rsrp                            INTEGER (FFS!)       OPTIONAL,
    rsrq                            INTEGER (FFS!)       OPTIONAL,
    sinr                            INTEGER (FFS!)       OPTIONAL
}
MeasReportQuantity::=           SEQUENCE {
    rsrp                            BOOLEAN,
    rsrq                            BOOLEAN,
    sinr                            BOOLEAN
}
M
-- TAG-REPORT-CONFIG-START
-- ASN1STOP
```

In yet another example, the parameter for event triggered report type may be encoded within each event, as it might not be applicable for other events to be introduced in the future, as shown below:

| ReportConfigNR information element |
|---|

```
-- ASN1START
-- TAG-REPORT-CONFIG-START
ReportConfigNR ::=                  SEQUENCE {
    reportType                          CHOICE {
        periodical                          PeriodicalReportConfig,
        eventTriggered                      EventTriggerConfig,
        reportCGI                           TYPE_FFS!,
        ...
    }
}
EventTriggerConfig::=               SEQUENCE {
    eventId                             CHOICE {
        eventA1                             SEQUENCE {
            a1-Threshold                        MeasTriggerQuantity,
            reportOnLeave                       BOOLEAN,
            hysteresis                          Hysteresis,
            timeToTrigger                       TimeToTrigger,
        triggerQuantity                 SEQUENCE {
            rsrp                                BOOLEAN,
            rsrq                                BOOLEAN,
            sinr                                BOOLEAN
        }
        },
        eventA2                             SEQUENCE {
            a2-Threshold                        MeasTriggerQuantity,
            reportOnLeave                       BOOLEAN,
            hysteresis                          Hysteresis,
            timeToTrigger                       TimeToTrigger,
        triggerQuantity                 SEQUENCE {
            rsrp                                BOOLEAN,
            rsrq                                BOOLEAN,
            sinr                                BOOLEAN
        }
        },
        eventA3                             SEQUENCE {
            a3-Offset                           MeasTriggerQuantityOffset,
            reportOnLeave                       BOOLEAN,
            hysteresis                          Hysteresis,
            timeToTrigger                       TimeToTrigger,
            useWhiteCellList                    BOOLEAN
                OPTIONAL,
            triggerQuantity                     ENUMERATED {rsrp, rsrq, sinr}
        },
        eventA4                             SEQUENCE {
            a4-Threshold                        MeasTriggerQuantity,
            reportOnLeave                       BOOLEAN,
            hysteresis                          Hysteresis,
            timeToTrigger                       TimeToTrigger,
            useWhiteCellList                    BOOLEAN
                    OPTIONAL,
        triggerQuantity                 SEQUENCE {
            rsrp                                BOOLEAN,
            rsrq                                BOOLEAN,
            sinr                                BOOLEAN
        }
        },
        eventA5                             SEQUENCE {
            a5-Threshold1                       MeasTriggerQuantity,
            a5-Threshold2                       MeasTriggerQuantity,
            reportOnLeave                       BOOLEAN,
            hysteresis                          Hysteresis,
            timeToTrigger                       TimeToTrigger,
            useWhiteCellList                    BOOLEAN
                OPTIONAL,
            triggerQuantity                     ENUMERATED {rsrp, rsrq, sinr}
        },
        eventA6                             SEQUENCE {
            a6-Offset                           MeasTriggerQuantityOffset,
            reportOnLeave                       BOOLEAN,
            hysteresis                          Hysteresis,
            timeToTrigger                       TimeToTrigger,
```

| ReportConfigNR information element |  |
| --- | --- |
| useWhiteCellList            BOOLEAN<br>    OPTIONAL,<br>triggerQuantity            SEQUENCE {<br>    rsrp                BOOLEAN,<br>    rsrq                BOOLEAN,<br>    sinr                BOOLEAN<br>  }<br>  },<br>},<br>rsType                ENUMERATED {ss, csi-rs},<br>reportInterval            ReportInterval,<br>reportAmount            ENUMERATED {FFS!},<br>reportQuantityCell            MeasReportQuantity,<br>maxReportCells            INTEGER (1..maxCellReport),<br>reportQuantityRsIndexes        MeasReportQuantity<br>    OPTIONAL,<br>maxNroRsIndexesToReport   INTEGER (1..maxNroIndexesToReport)<br>    OPTIONAL,<br>onlyReportBeamIds            BOOLEAN<br>        OPTIONAL<br>reportAddNeighMeas        TYPE_FFS!<br>}<br>PeriodicalReportConfig ::=        SEQUENCE {<br>    rsType                ENUMERATED {ss, csi-rs},<br>    reportInterval            ReportInterval,<br>    reportAmount            ENUMERATED {FFS!},<br>    triggerQuantity            SEQUENCE {<br>        rsrp                BOOLEAN,<br>        rsrq                BOOLEAN,<br>        sinr                BOOLEAN<br>    }<br>    reportQuantityCell            MeasReportQuantity,<br>    maxReportCells                INTEGER (1..maxCellReport),<br>    reportQuantityRsIndexes        MeasReportQuantity<br>        OPTIONAL,<br>    maxNroRsIndexesToReport        INTEGER<br>(1..maxNroIndexesToReport)<br>            OPTIONAL,<br>    onlyReportBeamIds            BOOLEAN<br>            OPTIONAL<br>}<br>MeasTriggerQuantity::=        CHOICE {<br>    rsrp                RSRPRange,<br>    rsrq                RSRQRange,<br>    sinr                SINRRange<br>}<br>MeasTriggerQuantityOffset::=        CHOICE {<br>    rsrp                INTEGER (FFS!)    OPTIONAL,<br>    rsrq                INTEGER (FFS!)    OPTIONAL,<br>    sinr                INTEGER (FFS!)    OPTIONAL<br>}<br>MeasReportQuantity::=        SEQUENCE {<br>    rsrp                BOOLEAN,<br>    rsrq                BOOLEAN,<br>    sinr                BOOLEAN<br>}<br>M<br>-- TAG-REPORT-CONFIG-START<br>-- ASN1STOP |

In still other embodiments, the single parameter called triggerQuantity may be defined in reportConfig for event triggered report type and periodical report type as a common parameter. However, the parameter triggerQuantity defined in reportConfig can be encoded as follows:

```
triggerQuantity ::= SEQUENCE {
    rsrp            BOOLEAN,
    rsrq            BOOLEAN,
    sinr            BOOLEAN
}.
```

And, in addition, the IE rsType is defined as a sequence, to indicate that an event could be triggered based on multiple RS types.

```
rsType ::= SEQUENCE {
    ssb             BOOLEAN,
    csi-rs          BOOLEAN
}.
```

According to certain other embodiments, the beam level quantity to be used for sorting the beam level measurements may be based on the sorting quantity selection method as specified in the measConfig and further based on the triggerQuantity specified in the reportConfig. In this embodiment, the network configures a mapping of triggerQuantity as specified in the reportConfig and the quantity used for the sorting method to be used by the UE for beam selection. Some of these mapping is provided in the table below (the following table will be provided in one way or the other in the measConfig).

| TriggerQuantity in the reportConfig | Measurement quantity to be used for the sorting of beam level measurements |
| --- | --- |
| RSRP | RSRP |
| RSRQ | RSRQ |
| SINR | SINR |
| RSRP and SINR | RSRP |
| RSRP and RSRQ | RSRP |
| RSRQ and SINR | SINR |
| RSRP and RSRQ and SINR | RSRP |

In certain other embodiments, the beam level quantity to be used for sorting the beam level measurements is based on the sorting quantity selection method (mapping table) as specified in the measConfig and further based on the reportQuantityRsIndexes specified in the reportConfig. In this embodiment, the network configures a mapping of reportQuantity as specified in the reportConfig and the quantity used for the sorting method to be used by the UE for beam selection. Some of these mapping is provided in the table below (the following table will be provided in one way or the other in the measConfig).

| reportQuantityRsIndexes in the reportConfig includes following beam level reporting quantity. | Measurement quantity to be used for the sorting of beam level measurements |
| --- | --- |
| onlyReportBeamIds | RSRP |
| RSRP | RSRP |
| RSRQ | RSRQ |
| SINR | SINR |
| RSRP and SINR | RSRP |
| RSRP and RSRQ | RSRP |
| RSRQ and SINR | SINR |
| RSRP and RSRQ and SINR | RSRP |

In other embodiments, where RSRQ and SINR are indicated for beam level reporting, the measurement quantity to be used for the sorting of beam level measurements may be RSRQ.

In another particular embodiment, for the case of multiple trigger quantities (e.g. RSRP and RSRQ), there can be an explicit parameter (cellsSortingQuantity) so that the UE knows which quantity shall be used for sorting the cells to include in measurement reports.

In another particular embodiment, for the case of multiple trigger quantities (e.g. RSRP and RSRQ), there can be an explicit parameter (beamsSortingQuantity) so that the UE knows which quantity shall be used for sorting the cells to include in measurement reports.

In another particular embodiment, for the case of multiple trigger quantities (e.g. RSRP and RSRQ), there can be an explicit parameter (sortingQuantity) so that the UE knows which quantity shall be used for sorting cells and beams to include in measurement reports.

In another particular embodiment, for the case of multiple RS types as trigger quantities (e.g. SSB based RSRP and CSI-RS based RSRP), there can be an explicit parameter (cellsSortingQuantity) so that the UE knows which RS type it shall be used for sorting the cells to include in measurement reports.

In another particular embodiment, for the case of multiple RS types as trigger quantities (e.g. SSB based RSRP and CSI-RS based RSRP), there can be an explicit parameter (beamsSortingQuantity) so that the UE knows which quantity shall be used for sorting the beams per cell to include in measurement reports.

In another particular embodiment, multiple RS types as trigger quantities (e.g. SSB based RSRP and CSI-RS based RSRP), there can be an explicit parameter (sortingQuantity) so that the UE knows which quantity shall be used for sorting cells and beams to include in measurement reports.

Figure 2:
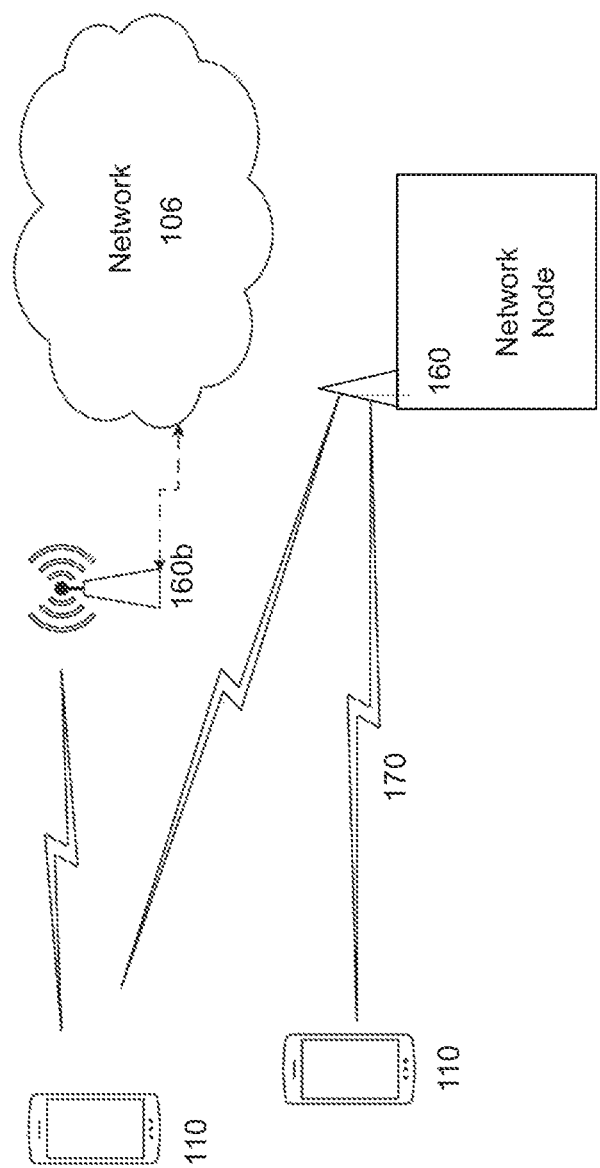
FIG. 2 illustrates an example network, according to certain embodiments.

FIG. 2 illustrates a wireless network, in accordance with certain embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b, and WDs 110 and 110b. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 3:
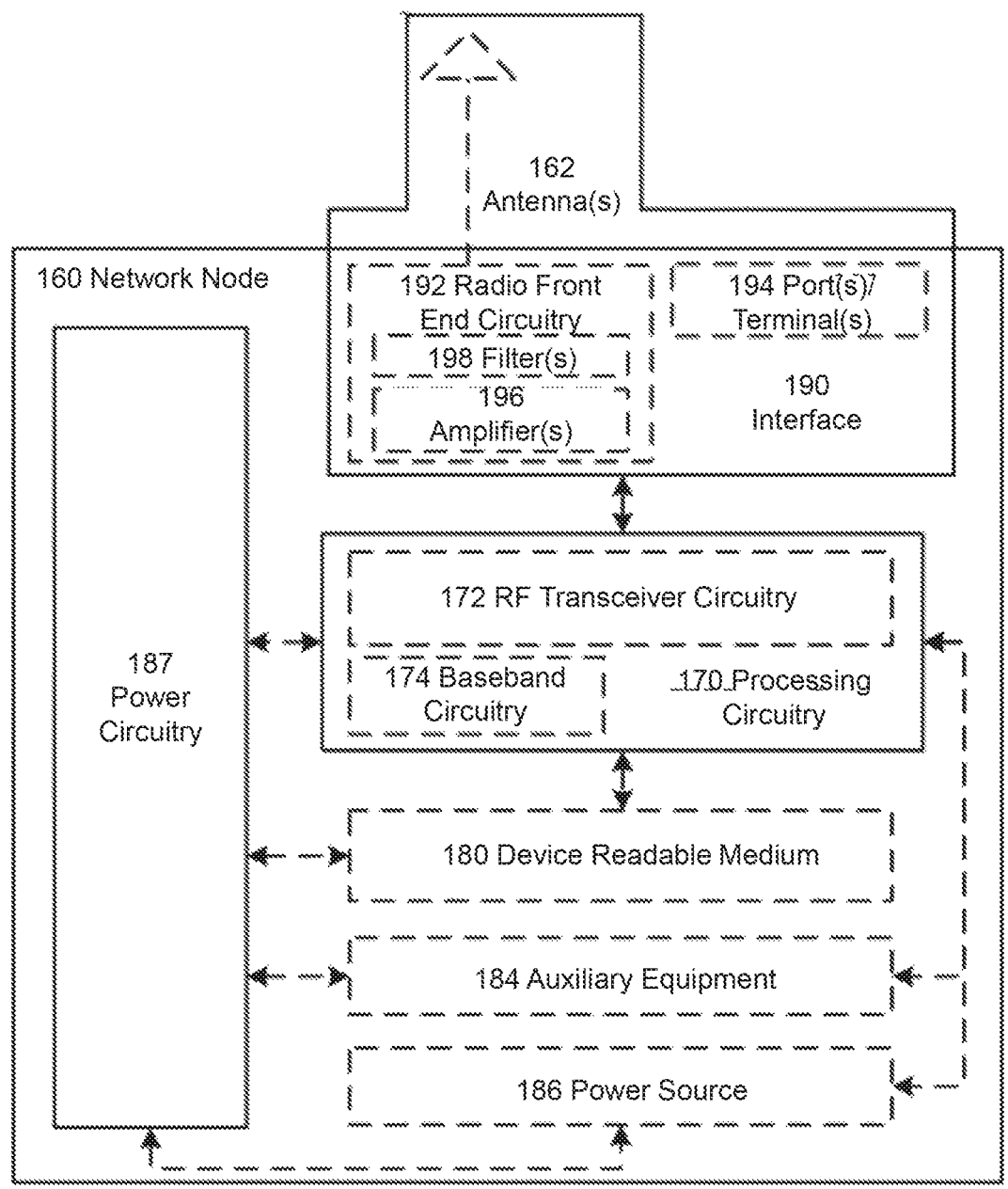
FIG. 3 illustrates an example network node, according to certain embodiments.

FIG. 3 illustrates a network node, in accordance with some embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port. Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 4:
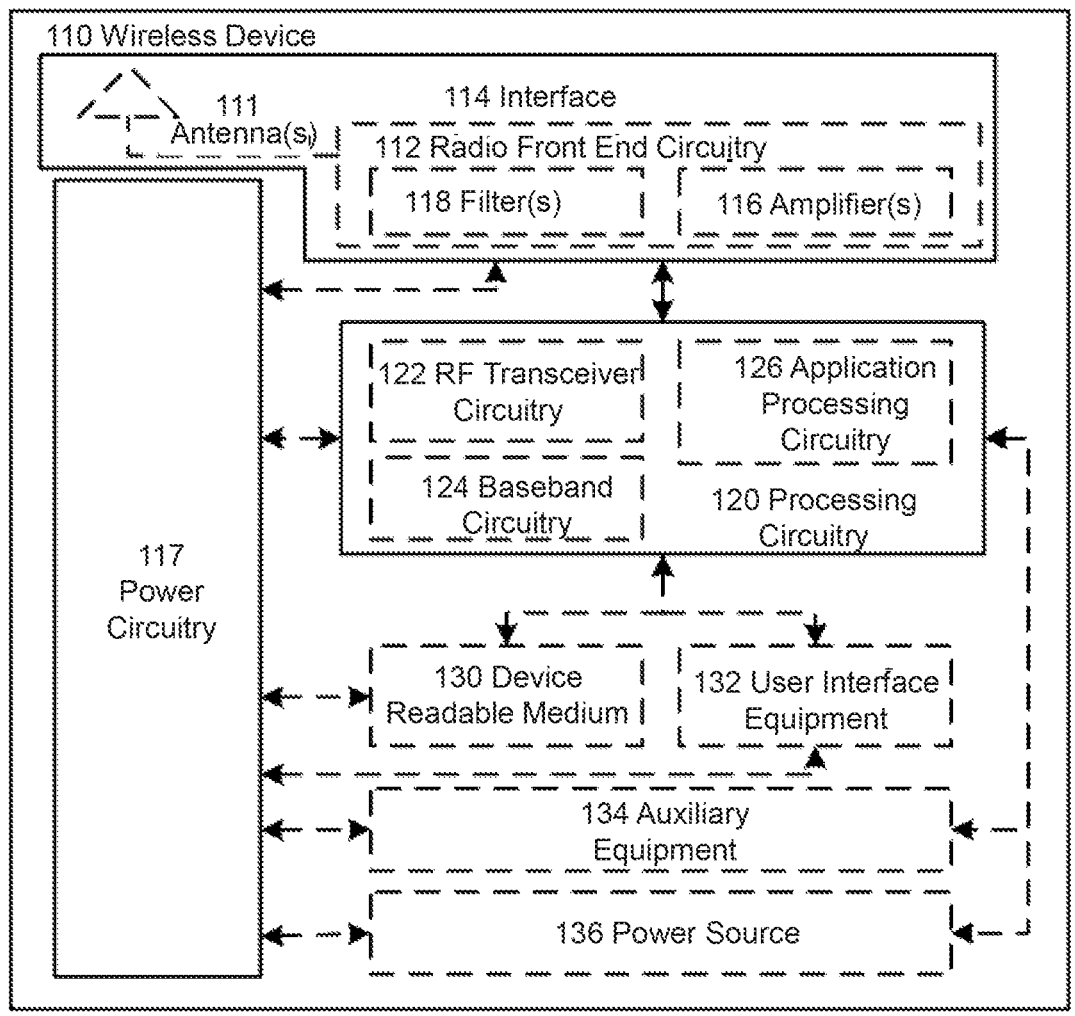
FIG. 4 illustrates an example wireless device, according to certain embodiments.

FIG. 4 illustrates a wireless device (WD) 110, in accordance with some embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 5:
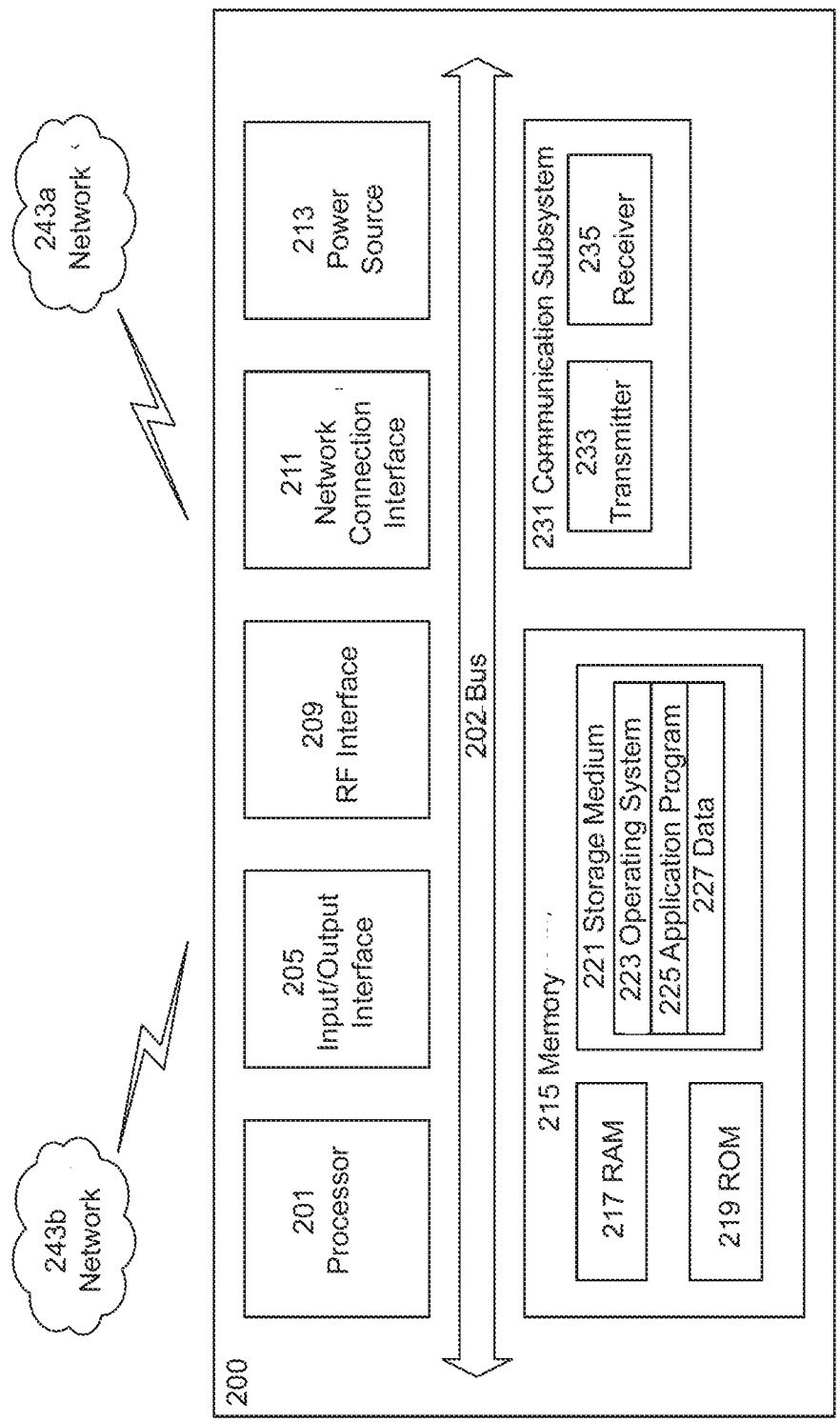
FIG. 5 illustrates an example embodiment of a UE, according to certain embodiments.

FIG. 5 illustrates one embodiment of a UE 200, in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
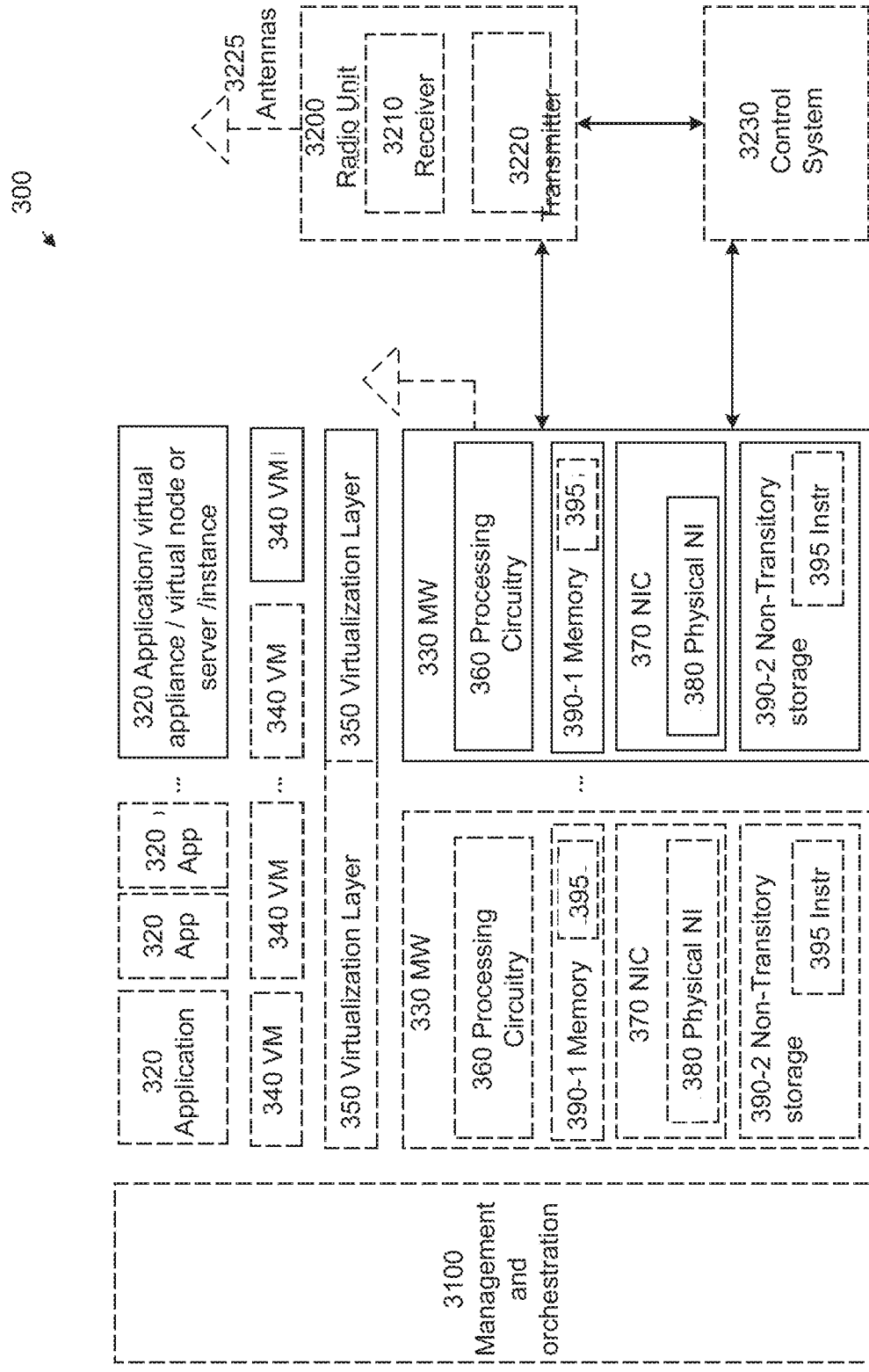
FIG. 6 illustrates a virtualization environment in which functions implemented by some embodiments may be virtualized, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 530 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 7:
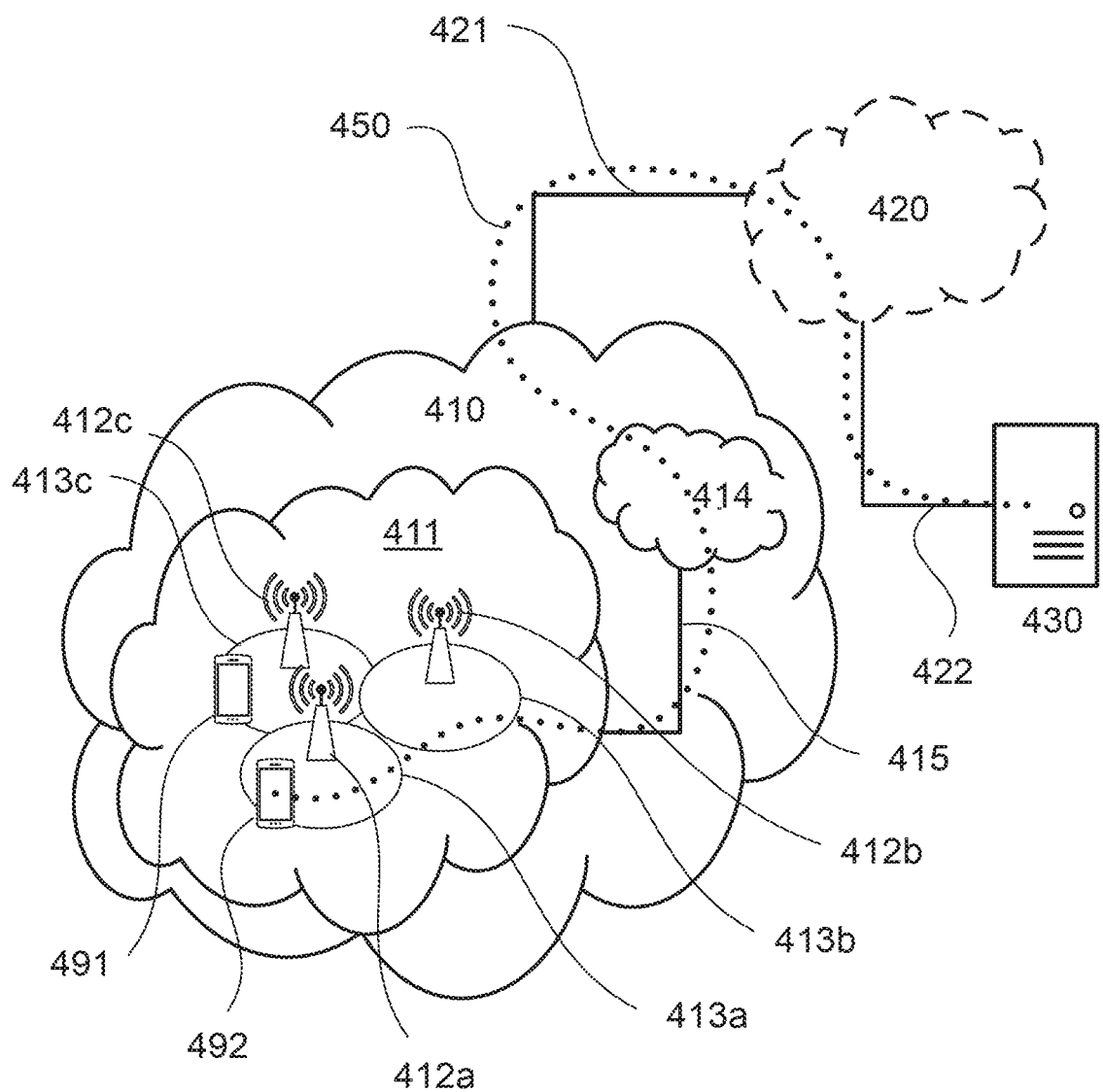
FIG. 7 illustrates a telecommunication network connected via an intermediate network to a host computer, according to certain embodiments.

FIG. 7 illustrates a telecommunication network connected via an intermediate network to a host computer in accordance with some embodiments. With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
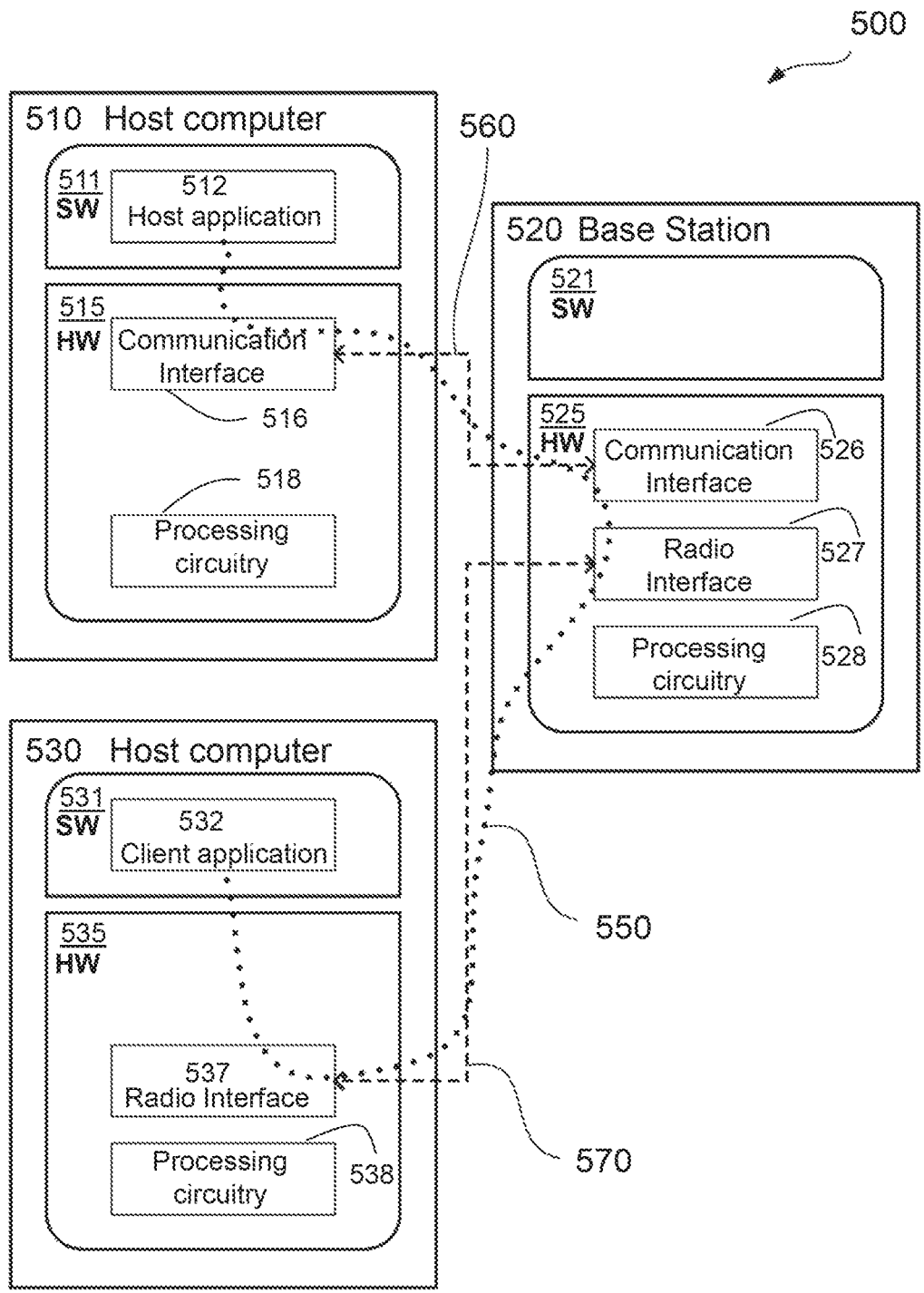
FIG. 8 illustrates a host computer communicating via a base station with a user equipment over a partially wireless connection, according to certain embodiments.

FIG. 8 illustrates a host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412*a*, 412*b*, 412*c* and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the beam sorting behavior of the UE in order to improve the ability to build self-optimized network functionality.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

FIG. 9 is a flowchart illustrating a method implemented in a communication system, in accordance with certain embodiments. The communication system includes a host computer, a base station and a UE which may be those described with reference to FIGS. 5 and 6. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 10 is a flowchart illustrating a method implemented in a communication system, in accordance with certain embodiments. The communication system includes a host computer, a base station and a UE which may be those described with reference to FIGS. 5 and 6. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 11, 12:
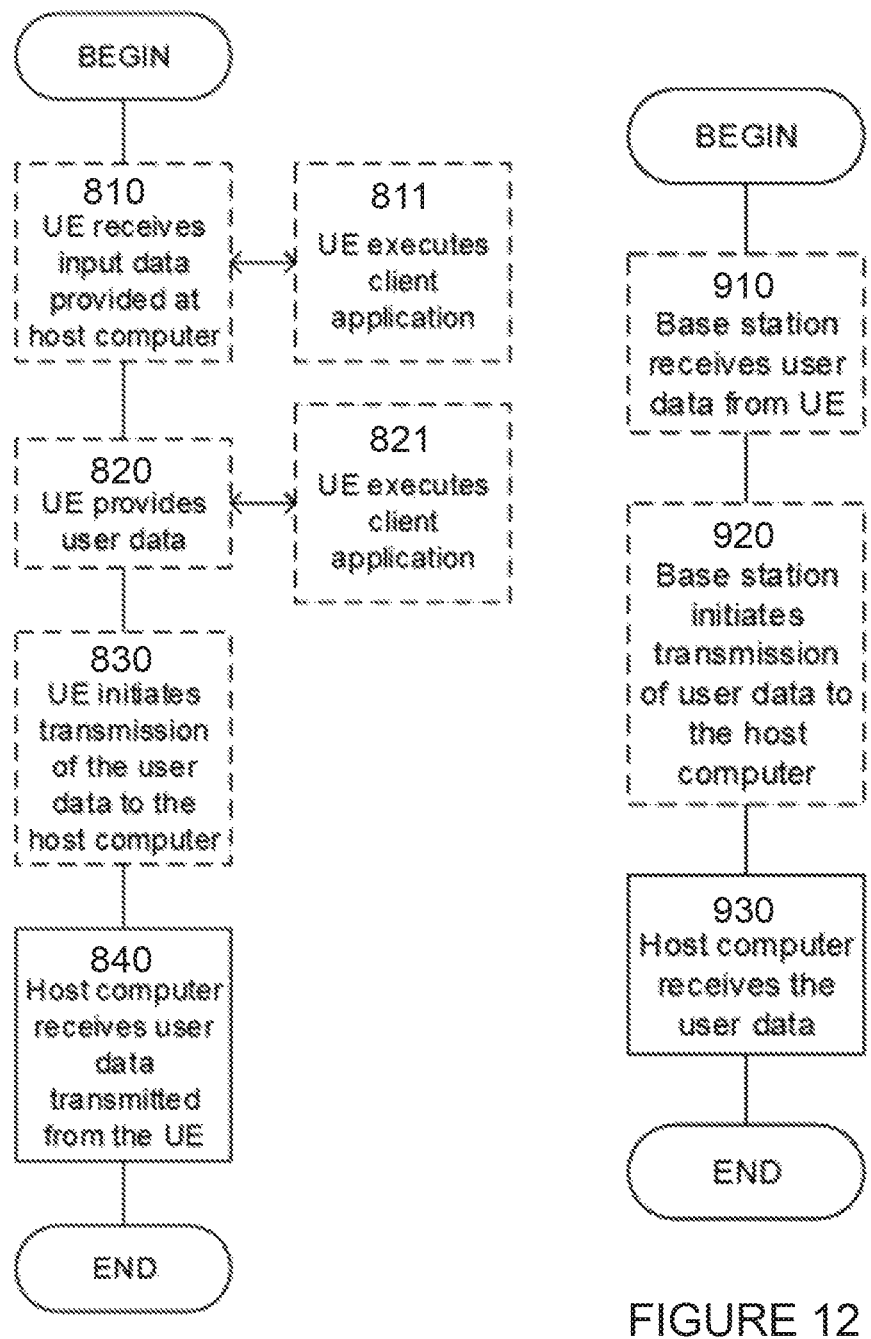
FIG. 11 illustrates another example method implemented in a communication system, according to certain embodiments.
FIG. 12 illustrates another example method implemented in a communication system, according to certain embodiments.

FIG. 11 is a flowchart illustrating a method implemented in a communication system, in accordance with certain embodiments. The communication system includes a host computer, a base station and a UE which may be those described with reference to FIGS. 5 and 6. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 12 is a flowchart illustrating a method implemented in a communication system, in accordance with certain embodiments. The communication system includes a host computer, a base station and a UE which may be those described with reference to FIGS. 5 and 6. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
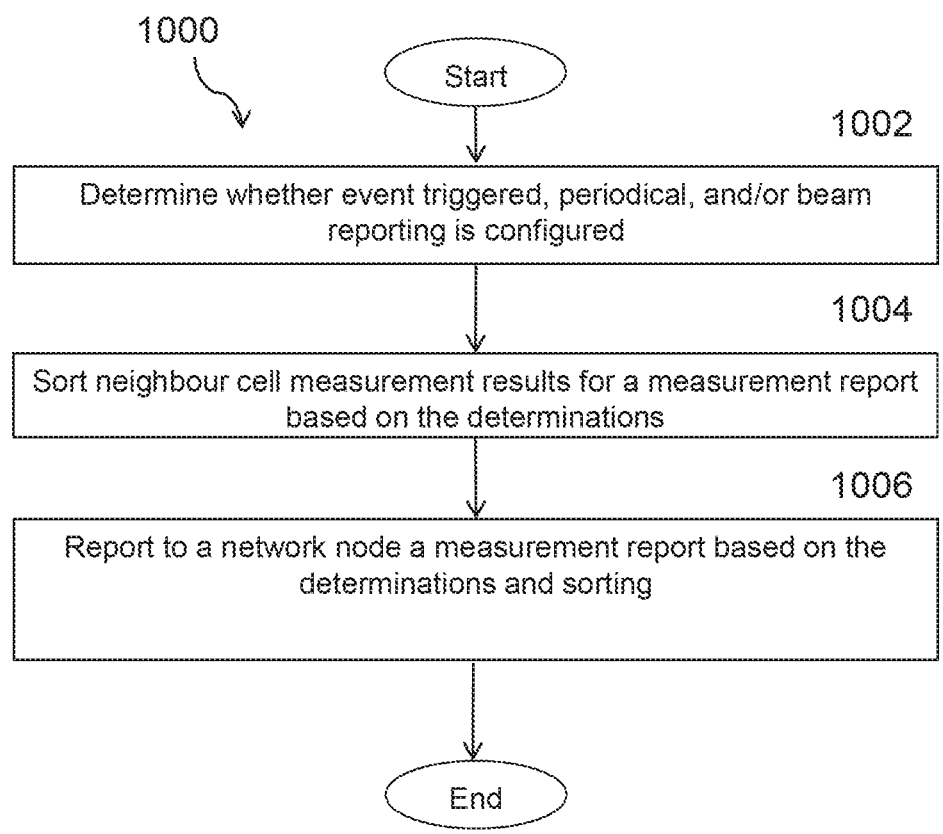
FIG. 13 illustrates an example method in a wireless network, according to certain embodiments.

FIG. 13 depicts a method in a wireless network, in accordance with certain embodiments. The method begins at step 1002 with determining whether event triggered, periodical, and/or beam reporting is configured. The method continues to step 1004 with sorting neighbour cell measurement results for a measurement report based on the determinations. The method continues to step 1006 with reporting to a network node a measurement report based on the determinations and sorting.

Figure 14:
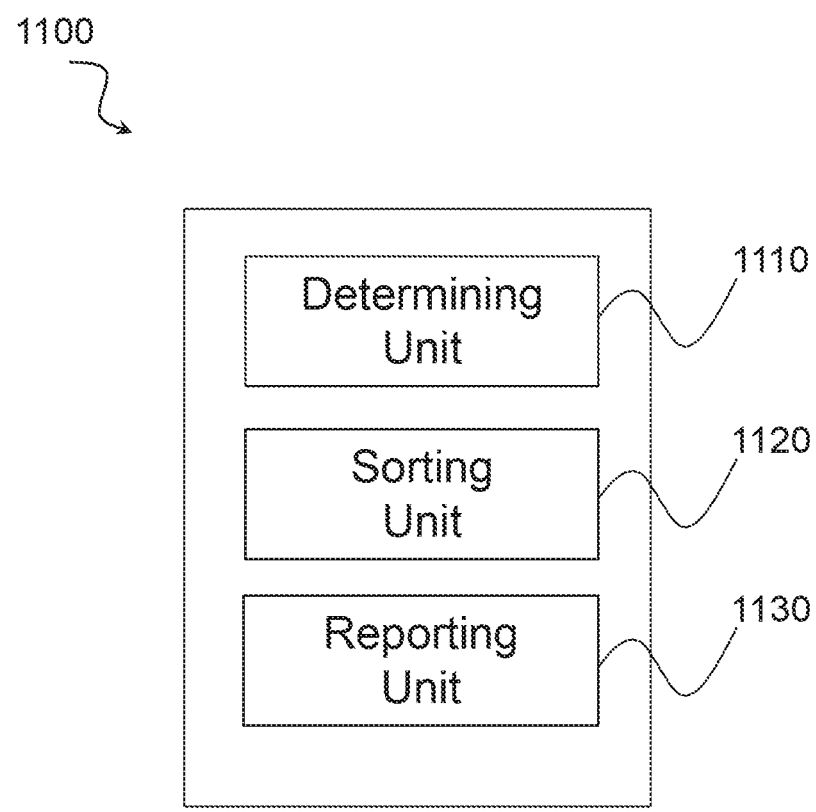
FIG. 14 illustrates a schematic block diagram of an apparatus in a wireless network, according to certain embodiments.

FIG. 14 illustrates a schematic block diagram of an apparatus 1100 in a wireless network (for example, the wireless network shown in FIG. 2), in according to certain embodiments. The apparatus may be implemented in a wireless device or network node (e.g., wireless device 110 or network node 160 shown in FIG. 2). Apparatus 1100 is operable to carry out the example method described with reference to FIG. 13 and possibly any other processes or methods disclosed herein. It is also to be understood that the method of FIG. 13 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1110, sorting unit 1120, and reporting unit 1130, any other suitable units of apparatus 1100 to perform corresponding functions according one or more embodiments of the present disclosure, such as the functionality described in FIG. 14.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
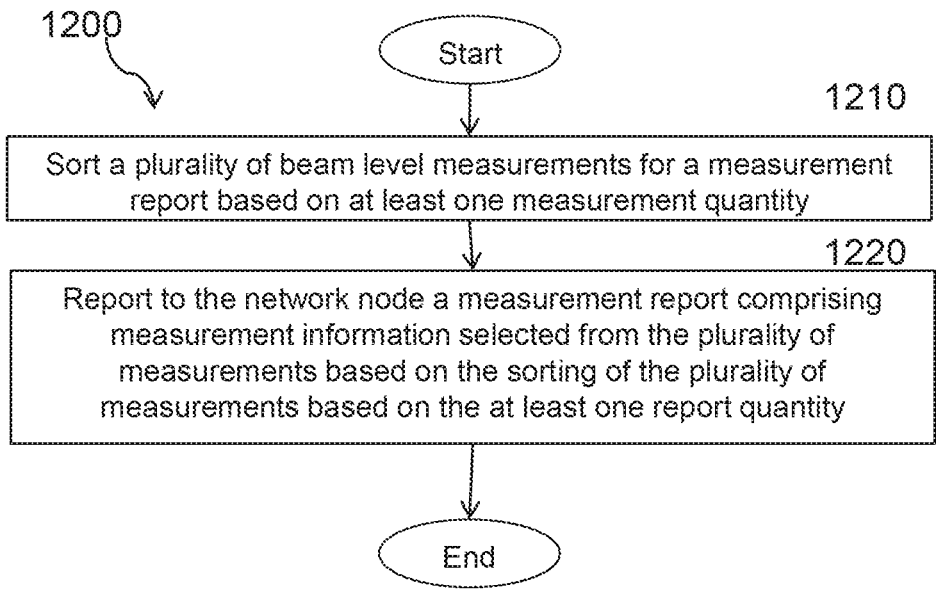
FIG. 15 illustrates an example method by a wireless device for measurement reporting, according to certain embodiments.

FIG. 15 depicts a method by a wireless device 110 for measurement reporting, according to certain embodiments. The method begins at step 1210 when wireless device 110 sorts a plurality of measurements for a measurement report based on at least one measurement quantity.

In a particular embodiment, the measurement quantity is a report quantity configured by the network. In another embodiment, the measurement quantity is a trigger quantity out of a set of multiple trigger quantities configured by the network.

In a particular embodiment, the plurality of measurements comprises beam level measurements. Additionally or alternatively, the plurality of measurements comprise cell level measurements.

In a particular embodiment, the plurality of measurements are for a serving cell of the wireless device. Additionally or alternatively, the plurality of measurements are for a neighbouring cell of the wireless device.

At step 1220, wireless device 110 reports to a network node 160 the measurement report comprising measurement information selected from the plurality of measurements based on the sorting of the plurality of measurements based on the at least one measurement quantity.

In a particular embodiment, the measurement information includes at least one of the plurality of measurements. Additionally or alternatively, the measurement information may include beam indexes.

In a particular embodiment, the measurement report includes beam level information of a primary cell (PCell) and a secondary cell (SCell).

In a particular embodiment, the wireless device 110 detects fulfillment of a measurement reporting criteria and sorts the plurality of measurements for the measurement report in response to detecting the fulfillment of the measurement reporting criteria.

In a particular embodiment, wireless device 110 is configured for periodical reporting. Wireless device 110 may receive information indicating the at least one measurement quantity from a network node.

For example, in a particular embodiment, the at least one measurement quantity indicates that only beam indexes are to be reported as part of beam level reporting, and wireless device 110 sorts the plurality of measurements based on RSRP.

In another example embodiment, the at least one measurement quantity indicates RSRP, and wireless device 110 sorts the plurality of measurements based on RSRP.

In yet another example embodiment, the at least one measurement quantity indicates RSRQ, and wireless device 110 sorts the plurality of measurements are sorted based on RSRQ.

In still another example embodiment, the at least one measurement quantity indicates SINR, and wireless device 110 sorts the plurality of measurements based on SINR.

In yet another example embodiment, the at least one measurement quantity indicates RSRP and at least one of SINR and RSRQ, and wireless device 110 sorts the plurality of measurements based on RSRP.

In a particular embodiment, the wireless device is configured for event-triggered reporting and the at least one measurement quantity comprises a trigger quantity.

In a particular embodiment, the plurality of measurements comprises one or more measurements for a neighbouring cell of the wireless device, and wireless device 110 sorts the one or more measurements for the neighbouring cell to identify at least one best neighbouring cell that does not to exceed a maximum number of cells to be reported. In a particular embodiment, a best one of the plurality of a measurements of a measurement type associated with the trigger quantity may be reported first in the measurement report.

Figure 16:
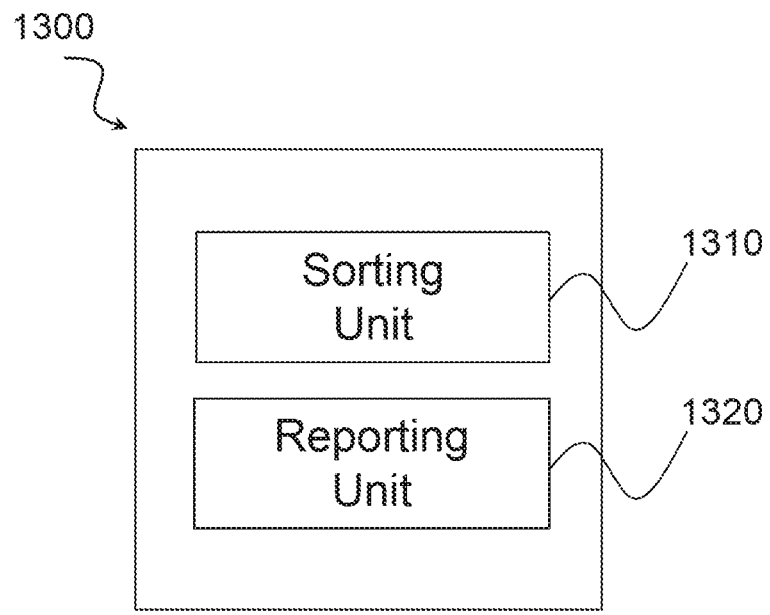
FIG. 16 illustrates a schematic block diagram of an apparatus in a wireless network, according to certain embodiments.

FIG. 16 illustrates a schematic block diagram of an apparatus 1300 in a wireless network (for example, the wireless network shown in FIG. 2). The apparatus may be implemented in a wireless device or network node (e.g., wireless device 110 or network node 160 shown in FIG. 2). Apparatus 1300 is operable to carry out the example method described with reference to FIG. 15 and possibly any other processes or methods disclosed herein. It is also to be understood that the method of FIG. 15 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sorting unit 1310, reporting unit 1320, and any other suitable units of apparatus 1300 to perform corresponding functions according one or more embodiments of the present disclosure, such as the functionality described in FIG. 15.

For example, sorting unit 1310 may perform the sorting functions of the apparatus 1300. In a particular embodiment, sorting unit 1310 may sort a plurality of measurements for a measurement report based on at least one measurement quantity.

For example, reporting unit 1320 may perform the reporting functions of the apparatus 1300. In a particular embodiment, reporting unit 1320 may to a network node 160 a measurement report comprising measurement information selected from the plurality of measurements based on the sorting of the plurality of measurements based on the at least one measurement quantity.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
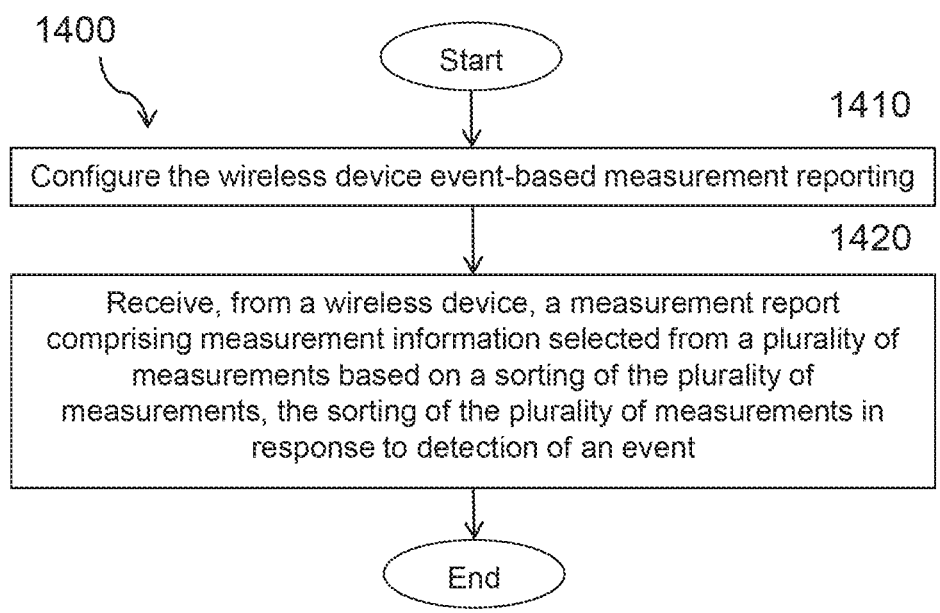
FIG. 17 illustrates an example method by a network node for configuring a wireless device for measurement reporting, according to certain embodiments.

FIG. 17 depicts a method by a network node 160 for configuring a wireless device 110 for measurement reporting, according to certain embodiments. The method begins at step 1410 when network node 160 configures wireless device 110 for event-based measurement reporting.

In a particular embodiment, the plurality of measurements comprises beam level measurements. Additionally or alternatively, the plurality of measurements comprise cell level measurements.

In a particular embodiment, the plurality of measurements are for a serving cell of wireless device 110. Additionally or alternatively, in a particular embodiment, the plurality of measurements are for a neighbouring cell of wireless device 110.

At step 1420, network node 160 receives, from wireless device 110, a measurement report comprising measurement information selected from a plurality of measurements based on a sorting of the plurality of measurements. The sorting of the plurality of measurements is in response to detection of an event.

In a particular embodiment, the measurement information includes at least one of the plurality of measurements. Additionally or alternatively, in a particular embodiment, the measurement information includes beam indexes.

In a particular embodiment, the measurement report may include beam level information of a PCell and a SCell.

In a particular embodiment, the plurality of measurements are sorted for the measurement report based on at least one measurement quantity.

In a particular embodiment, the measurement quantity is a report quantity configured by the network.

In a particular embodiment, the measurement quantity is a trigger quantity out of a set of multiple trigger quantities configured by the network.

According to certain particular embodiments, network node 160 may transmit information indicating the at least one measurement quantity to the wireless device.

In a particular example embodiment, the at least one measurement quantity indicates that only beam indexes are to be reported as part of beam level reporting and the plurality of measurements are sorted based on RSRP.

In another example embodiment, the at least one measurement quantity indicates RSRP and the plurality of measurements are sorted based on RSRP.

In still another example embodiment, the at least one measurement quantity indicates RSRQ and the plurality of measurements are sorted based on RSRQ.

In yet another example embodiment, the at least one measurement quantity indicates SINR and the plurality of measurements are sorted based on SINR.

In yet another example embodiment, the at least one measurement quantity indicates RSRP and at least one of SINR and RSRQ, and the plurality of measurements is sorted based on RSRP.

In a particular embodiment, configuring the wireless device 110 for event-based measurement reporting may include configuring the wireless device 110 for event-triggered reporting and the at least one measurement quantity includes a trigger quantity.

In a particular embodiment, a best one of the plurality of a measurements of a measurement type associated with the trigger quantity is reported first in the measurement report.

In a particular embodiment, network node 160 may configure wireless device 110 for periodical reporting.

In a particular embodiment, the plurality of measurements include one or more measurements for a neighbouring cell of the wireless device and the one or more measurements for the neighbouring cell are sorted to identify at least one best neighbouring cell. The at least one best neighbouring cell does not to exceed a maximum number of cells to be reported.

Figure 18:
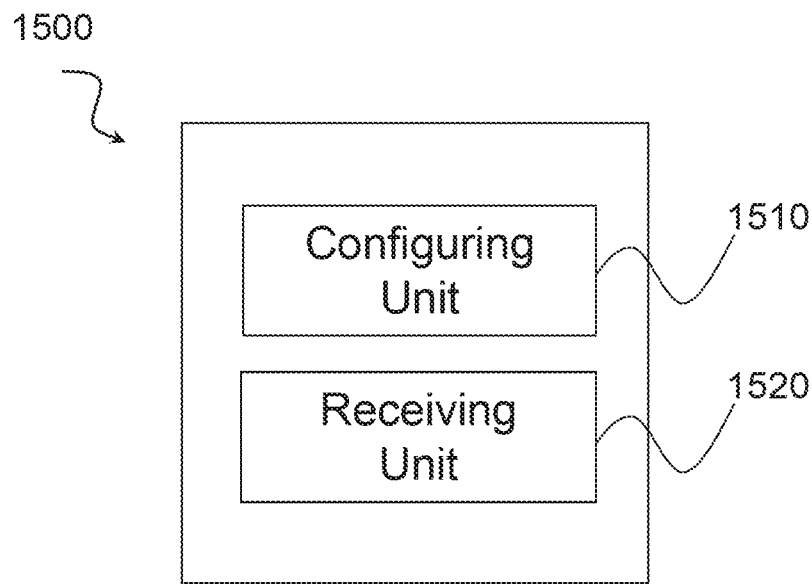
FIG. 18 illustrates a schematic block diagram of an apparatus in a wireless network, according to certain embodiments.

FIG. 18 illustrates a schematic block diagram of an apparatus 1500 in a wireless network (for example, the wireless network shown in FIG. 2). The apparatus may be implemented in a wireless device or network node (e.g., wireless device 110 or network node 160 shown in FIG. 2). Apparatus 1500 is operable to carry out the example method described with reference to FIG. 17 and possibly any other processes or methods disclosed herein. It is also to be understood that the method of FIG. 17 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause configuring unit 1510, receiving unit 1520, and any other suitable units of apparatus 1500 to perform corresponding functions according one or more embodiments of the present disclosure, such as the functionality described in FIG. 17.

For example, configuring unit 1510 may perform the configuring functions of the apparatus 1500. In a particular embodiment, configuring unit 1510 may configure wireless device 110 for event-based measurement reporting.

For example, receiving unit 1520 may perform the receiving functions of the apparatus 1500. In a particular embodiment, receiving unit 1520 may receive, from wireless device 110, a measurement report comprising measurement information selected from a plurality of measurements based on a sorting of the plurality of measurements in response to detection of an event.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

According to certain example embodiments, a method performed by a wireless device for measurement reporting comprises: determining whether event triggered, periodical, and/or beam reporting is configured for the wireless device; sorting neighbour cell measurement results for a measurement report based on the determinations; and reporting to a network node a measurement report based on the determinations and sorting. Optionally, the method may further include providing user data and forwarding the user data to a host computer via the transmission to the base station.

According to certain example embodiments, a wireless device for measurement reporting includes processing circuitry configured to perform any of the steps of the example embodiments above and power supply circuitry configured to supply power to the wireless device.

According to certain example embodiments, a UE for measurement reporting includes: an antenna configured to send and receive wireless signals; radio front-end circuitry connected to the antenna and to processing circuitry and configured to condition signals communicated between the antenna and the processing circuitry; the processing circuitry being configured to perform any of the steps of the example embodiments above; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

According to certain example embodiments, a communication system including a host computer comprises processing circuitry configured to provide user data and a communication interface configured to forward user data to a cellular network for transmission to a user equipment (UE), wherein the UE comprises a radio interface and processing circuitry, the UE's components configured to perform any of the steps of any of the example embodiments above. Optionally, the cellular network further includes a base station configured to communicate with the UE. Optionally, the communication system of the previous 2 embodiments, wherein the processing circuitry of the host computer is configured to execute a host application, thereby providing the user data and the UE's processing circuitry is configured to execute a client application associated with the host application.

According to certain example embodiments, a method implemented in a communication system including a host computer, a base station and a user equipment (UE) comprises: at the host computer, providing user data; and at the host computer, initiating a transmission carrying the user data to the UE via a cellular network comprising the base station, wherein the UE performs any of the steps of any of the example embodiments above. Optionally, the method of the previous embodiment, further comprises at the UE, receiving the user data from the base station.

According to certain example embodiments, a communication system including a host computer comprises: communication interface configured to receive user data originating from a transmission from a UE to a base station, wherein the UE comprises a radio interface and processing circuitry, the UE's processing circuitry configured to perform any of the steps of any of the example embodiments above. Optionally, the communication system of the previous embodiment further includes the UE. Optionally, the communication system of the previous embodiments, further includes the base station, wherein the base station comprises a radio interface configured to communicate with the UE and a communication interface configured to forward to the host computer the user data carried by a transmission from the UE to the base station. Optionally, the communication system of the previous embodiments, wherein: the processing circuitry of the host computer is configured to execute a host application and the UE's processing circuitry is configured to execute a client application associated with the host application, thereby providing the user data. Optionally, the processing circuitry of the host computer is configured to execute a host application, thereby providing request data and the UE's processing circuitry is configured to execute a client application associated with the host application, thereby providing the user data in response to the request data.

According to certain example embodiments, a method implemented in a communication system includes a host computer, a base station and a user equipment (UE), and the method comprises at the host computer, receiving user data transmitted to the base station from the UE, wherein the UE performs any of the steps of any of the example embodiments above. Optionally, the method further comprises, at the UE, providing the user data to the base station. Optionally, the method further comprises, at the UE, executing a client application, thereby providing the user data to be transmitted and, at the host computer, executing a host application associated with the client application. Optionally, the method further includes, at the UE, executing a client application and, at the UE, receiving input data to the client application, the input data being provided at the host computer by executing a host application associated with the client application, wherein the user data to be transmitted is provided by the client application in response to the input data.

According to certain example embodiments, a method implemented in a communication system that includes a host computer, a base station and a user equipment (UE) includes, at the host computer, receiving, from the base station, user data originating from a transmission which the base station has received from the UE, wherein the UE performs any of the steps of any of example embodiments above. Optionally, the method further comprises, at the base station, receiving the user data from the UE. Optionally, the method further includes, at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for measurement reporting, the method comprising:
receiving a reporting configuration from a network node, the reporting configuration specifying a plurality of different types of report quantities to be included in a measurement report;
determining whether to use Reference Signal Received Power (RSRP) or Reference Signal Received Quality (RSRQ) as a measurement quantity for sorting of beam-level measurements based on the plurality of reporting quantities specified in the reporting configuration, wherein RSRQ is determined to be used as the measurement quantity, because the reporting configuration received from the network node does not indicate RSRP as one of the plurality of different types of report quantities;
sorting a plurality of beam-level measurements for a periodical measurement report based on at least the determined measurement quantity; and
reporting to a network node the measurement report comprising measurement information selected from the plurality of beam-level measurements based on the sorting of the plurality of beam-level measurements based on at least the determined measurement quantity.

2. The method of claim 1, wherein the measurement quantity is a report quantity configured by the network.

3. The method of claim 1, wherein the plurality of beam-level measurements are for a serving cell of the wireless device.

4. The method of claim 1, wherein the plurality of beam-level measurements are for a neighbouring cell of the wireless device.

5. The method of claim 1, wherein:
determining that RSRP is to be used as the measurement quantity when the reporting configuration received from the network node indicates that only beam indexes are to be reported as part of beam level reporting; and
sorting the plurality of beam-level measurements comprises sorting the plurality of beam-level measurements based on RSRP.

6. The method of claim 1, wherein:
determining that RSRP is to be used as the measurement quantity when the reporting configuration received from the network node indicates RSRP as one of the plurality of different report quantities; and
sorting the plurality of beam-level measurements comprises sorting the plurality of beam-level measurements based on RSRP.

7. A wireless device for measurement reporting, the wireless device comprising:
processing circuitry configured to:
receive a reporting configuration from a network node, the reporting configuration specifying a plurality of different types of report quantities to be included in a measurement report;
determine whether to use Reference Signal Received Power (RSRP) or Reference Signal Received Quality (RSRQ) as a measurement quantity for sorting of beam-level measurements based on the plurality of reporting quantities specified in the reporting configuration, wherein RSRQ is determined to be used as the measurement quantity, because the reporting configuration received from the network node does not indicate RSRP as one of the plurality of different types of report quantities;
sort a plurality of beam-level measurements for a periodical measurement report based on at least the determined measurement quantity; and
report to a network node the measurement report comprising measurement information selected from the plurality of beam-level measurements based on the sorting of the plurality of beam-level measurements based on at least the determined measurement quantity.

8. The wireless device of claim 7, wherein the measurement quantity is a report quantity configured by the network.

9. The wireless device of claim 7, wherein the plurality of beam-level measurements are for a serving cell of the wireless device.

10. The wireless device of claim 7, wherein the plurality of beam-level measurements are for a neighbouring cell of the wireless device.

11. The wireless device of claim 7, wherein the processing circuitry is further configured to:
determine that RSRP is to be used as the measurement quantity when the reporting configuration received from the network node indicates that only beam indexes are to be reported as part of beam level reporting; and
sort the plurality of beam-level measurements based on RSRP.

12. The wireless device of claim 7, wherein the processing circuitry is further configured to:
determine that RSRP is to be used as the measurement quantity when the reporting configuration received from the network node indicates RSRP as one of the plurality of different report quantities; and sort the plurality of beam-level measurements based on RSRP.

13. A method performed by a network node for configuring a wireless device for measurement reporting, the method comprising:
    sending the wireless device a reporting configuration specifying a plurality of different types of report quantities to be included in a measurement report, the plurality of different report quantities for use in determining whether to use Reference Signal Received Power (RSRP) or Reference Signal Received Quality (RSRQ) as a measurement quantity for sorting of beam-level measurements, wherein RSRQ is determined to be used as the measurement quantity, because the reporting configuration does not indicate RSRP as one of the plurality of different types of report quantities;
    configuring the wireless device periodical measurement reporting; and
    receiving, from the wireless device, a measurement report comprising measurement information selected from a plurality of beam-level measurements based on a sorting of the plurality of beam-level measurements, the sorting of the plurality of beam-level measurements performed based on the determined measurement quantity.

14. The method of claim 13, wherein the plurality of beam-level measurements are for a serving cell of the wireless device.

15. The method of claim 13, wherein the plurality of beam-level measurements are for a neighbouring cell of the wireless device.

16. The method of claim 13, wherein:
    the wireless device determines that RSRP is to be used as the measurement quantity when the reporting configuration indicates that only beam indexes are to be reported as part of beam level reporting; and
    the plurality of beam-level measurements are sorted based on RSRP.

17. The method of claim 13, wherein:
    the wireless device determines that RSRP is to be used as the measurement quantity when the reporting configuration indicates RSRP as one of the plurality of different report quantities; and
    the plurality of beam-level measurements are sorted based on RSRP.

18. A network node for configuring a wireless device for measurement reporting, the network node comprising:
    processing circuitry configured to:
        send the wireless device a reporting configuration specifying a plurality of different types of report quantities to be included in a measurement report, the plurality of different report quantities for use in determining whether to use Reference Signal Received Power (RSRP) or Reference Signal Received Quality (RSRQ) as a measurement quantity for sorting of beam-level measurements, wherein RSRQ is determined to be used as the measurement quantity, because the reporting configuration does not indicate RSRP as one of the plurality of different types of report quantities;
        configure the wireless device periodical measurement reporting; and
        receive, from the wireless device, a measurement report comprising measurement information selected from a plurality of beam-level measurements based on a sorting of the plurality of beam-level measurements, the sorting of the plurality of beam-level measurements performed based on the determined measurement quantity.

19. The network node of claim 18, wherein the plurality of beam-level measurements are for a serving cell of the wireless device.

20. The network node of claim 18, wherein the plurality of beam-level measurements are for a neighbouring cell of the wireless device.

21. The network node of claim 18, wherein:
    the wireless device determines that RSRP is to be used as the measurement quantity when the reporting configuration indicates that only beam indexes are to be reported as part of beam level reporting; and
    the plurality of beam-level measurements are sorted based on RSRP.

22. The network node of claim 18, wherein:
    the wireless device determines that RSRP is to be used as the measurement quantity when the reporting configuration indicates RSRP as one of the plurality of different report quantities; and
    the plurality of beam-level measurements are sorted based on RSRP.

* * * * *

UNITED STATES PATENT AND TRADEMARK OFFICE
CERTIFICATE OF CORRECTION

PATENT NO. : 11,606,707 B2
APPLICATION NO. : 16/943283
DATED : March 14, 2023
INVENTOR(S) : da Silva et al.

It is certified that error appears in the above-identified patent and that said Letters Patent is hereby corrected as shown below:

On the Title Page

On Page 2, in Item (56), under "OTHER PUBLICATIONS", in Column 2, Line 1, delete ""Reamining" and insert -- "Remaining --, therefor.

On Page 2, in Item (56), under "OTHER PUBLICATIONS", in Column 2, Line 9, delete "Cedex ;" and insert -- Cedex; --, therefor.

On Page 2, in Item (56), under "OTHER PUBLICATIONS", in Column 2, Line 29, delete "data,"" and insert -- data," --, therefor.

On Page 2, in Item (56), under "OTHER PUBLICATIONS", in Column 2, Line 29, delete "Jml." and insert -- Jrnl. --, therefor.

On Page 2, in Item (56), under "OTHER PUBLICATIONS", in Column 2, Line 37, delete "=WO2019106536&tab=PCTDOCU ME NTS&_cid" and insert -- =WO2019106536&tab=PCTDOCUMENTS&_cid --, therefor.

In the Drawings

In Fig. 3, Sheet 3 of 14, for Tag "174", in Lines 1-2, delete "Baseband Circuitry" and insert -- Baseband Processing Circuitry --, therefor.

In Fig. 4, Sheet 4 of 14, for Tag "124", in Lines 1-2, delete "Baseband Circuitry" and insert -- Baseband Processing Circuitry --, therefor.

In Fig. 4, Sheet 4 of 14, delete Tag "117" and insert Tag -- 137 --, therefor.

In Fig. 5, Sheet 5 of 14, for Tag "201", in Line 1, delete "Processor" and insert -- Processing Circuitry --, therefor.

Signed and Sealed this
First Day of October, 2024

Katherine Kelly Vidal
*Director of the United States Patent and Trademark Office*

CERTIFICATE OF CORRECTION (continued)
U.S. Pat. No. 11,606,707 B2

In Fig. 6, Sheet 6 of 14, delete 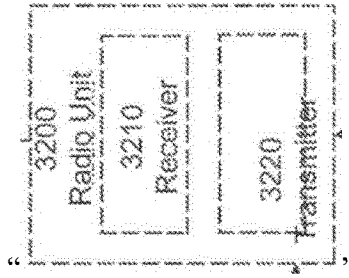 " and insert -- 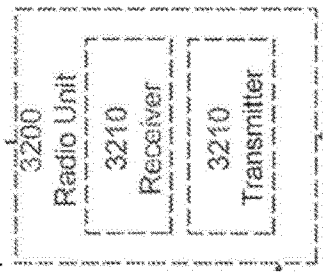 --, therefor.

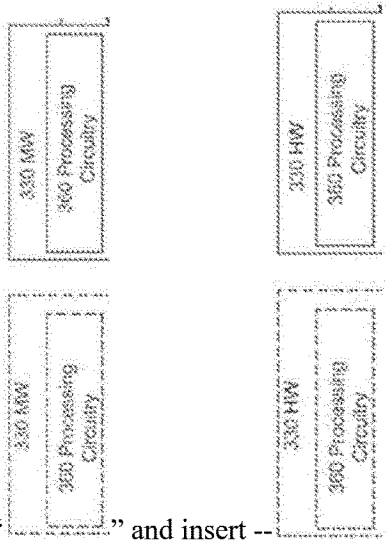

In Fig. 6, Sheet 6 of 14, delete " " and insert -- --, therefor.

In Fig. 8, Sheet 8 of 14, for Tag "530", in Line 1, delete "Host computer" and insert -- User Equipment --, therefor.

In Fig. 11, Sheet 10 of 14, for Step "810", in Line 3, delete "provided at" and insert -- provided by --, therefor.

In the Specification

In Column 1, Line 8, delete "of co-pending U.S." and insert -- of U.S. --, therefor.

In Column 1, Line 10, delete "2019," and insert -- 2019, now Pat. No. 10,772,001, --, therefor.

In Column 1, Line 11, delete "filed" and insert -- filed on --, therefor.

In Column 1, Line 13, delete "filed" and insert -- filed on --, therefor.

In Column 1, Line 22, delete "Specifically, it has been agreed that:" and insert the same at Line 21, after "NR." as a continuation paragraph.

In Column 1, Line 25, delete "(CSI_RS))" and insert -- (CSI-RS)) --, therefor.

CERTIFICATE OF CORRECTION (continued)
U.S. Pat. No. 11,606,707 B2

In Column 1, Line 29, delete "reporting)" and insert -- reporting). --, therefor.

In Column 4, Line 52, delete "NR." and insert -- NR: --, therefor.

In Column 5, Line 30, delete "shall" and insert -- Shall --, therefor.

In Column 6, Line 18, delete "self-optimized network" and insert -- self-optimizing network --, therefor.

In Column 6, Line 27, delete "embodiments," and insert -- embodiments; --, therefor.

In Column 18, Line 41, delete "SNIR." and insert -- SINR. --, therefor.

In Column 34, Line 50, delete "(WiMax)," and insert -- (WiMAX), --, therefor.

In Column 36, Line 4, delete "NodeB's." and insert -- NodeBs. --, therefor.

In Column 36, Line 45, delete "(SOC)." and insert -- (SoC). --, therefor.

In Column 38, Line 1, delete "circuitry 190" and insert -- circuitry 192 --, therefor.

In Column 38, Line 45, delete "integrated in," and insert -- integrated into, --, therefor.

In Column 39, Lines 11-12, delete "a wireless cameras," and insert -- a wireless camera, --, therefor.

In Column 39, Line 17, delete "(CPE)." and insert -- (CPE), --, therefor.

In Column 39, Line 31, delete "narrow band" and insert -- narrowband --, therefor.

In Column 39, Line 35, delete "etc.) personal" and insert -- etc.), personal --, therefor.

In Column 39, Line 67, delete "considered an" and insert -- considered as an --, therefor.

In Column 40, Lines 3-4, delete "Radio front end circuitry 114" and insert -- Radio front end circuitry 112 --, therefor.

In Column 40, Line 46, delete "SOC." and insert -- SoC. --, therefor.

In Column 41, Line 59, delete "proximity or" and insert -- proximity sensor or --, therefor.

In Column 42, Line 55, delete "interchangeable." and insert -- interchangeably. --, therefor.

In Column 42, Lines 63-64, delete "power source 233," and insert -- power source 213, --, therefor.

In Column 44, Line 21, delete "data file 227." and insert -- data 227. --, therefor.

CERTIFICATE OF CORRECTION (continued)
U.S. Pat. No. 11,606,707 B2

In Column 44, Lines 28-29, delete "high-density digital versatile disc (HD-DVD)" and insert -- high-definition digital versatile disc (HD-DVD) --, therefor.

In Column 44, Lines 34-35, delete "removable user identity (SM/RUIM) module," and insert -- removable user identity module (SM/RUIM), --, therefor.

In Column 44, Line 56, delete "WiMax," and insert -- WiMAX, --, therefor.

In Column 45, Lines 66-67, delete "memory 390. Memory 390," and insert -- memory 390-1. Memory 290-1, --, therefor.

In Column 46, Line 53, delete "onto" and insert -- into --, therefor.

In Column 46, Line 61, delete "hardware 530" and insert -- hardware 330 --, therefor.

In Column 46, Line 64, delete "virtual network elements" and insert -- virtual network element --, therefor.

In Column 49, Line 38, delete "self-optimized network" and insert -- self-optimizing network --, therefor.

In Column 49, Line 64, delete "in that" and insert -- such that --, therefor.

In Column 50, Line 52, delete "substep 830" and insert -- step 830 --, therefor.

In Column 51, Line 10, delete "microprocessor" and insert -- microprocessors --, therefor.

In Column 51, Line 24, delete "according one" and insert -- according to one --, therefor.

In Column 51, Line 37, delete "in according" and insert -- in accordance --, therefor.

In Column 51, Line 48, delete "microprocessor" and insert -- microprocessors --, therefor.

In Column 51, Line 64, delete "according one" and insert -- according to one --, therefor.

In Column 53, Line 25, delete "microprocessor" and insert -- microprocessors --, therefor.

In Column 53, Line 40, delete "according one" and insert -- according to one --, therefor.

In Column 55, Line 15, delete "microprocessor" and insert -- microprocessors --, therefor.

In Column 55, Lines 30-31, delete "according one" and insert -- according to one --, therefor.

In Column 57, Line 38, delete "an inconsistency" and insert -- any inconsistency --, therefor.

CERTIFICATE OF CORRECTION (continued)
U.S. Pat. No. 11,606,707 B2

In Column 57, Line 53, delete "CDMA Code Division Multiplexing Access" and insert -- CDMA Code Division Multiple Access --, therefor.

In Column 57, Line 54, delete "CGI Cell Global Identifier" and insert -- CGI Cell Global Identity --, therefor.

In Column 57, Line 60, delete "information" and insert -- Information --, therefor.

In Column 58, Line 5, delete "E-SMLC Evolved-Serving Mobile Location Centre".

In Column 58, Line 9, delete "E-SMLC evolved Serving Mobile Location Center" and insert -- E-SMLC Enhanced Serving Mobile Location Center --, therefor.

In Column 58, Line 48, delete "PDP Profile Delay Profile" and insert -- PDP Power Delay Profile --, therefor.

In Column 58, Line 53, delete "PMI Precoder Matrix Indicator" and insert -- PMI Precoding Matrix Indicator --, therefor.

In Column 58, Line 63, delete "RLM Radio Link Management" and insert -- RLM Radio Link Monitoring --, therefor.

In Column 59, Line 17, delete "SON Self Optimized Network" and insert -- SON Self-Optimizing Network --, therefor.

In Column 59, Line 27, delete "UMTS Universal Mobile Telecommunication System" and insert -- UMTS Universal Mobile Telecommunications System --, therefor.

In Column 59, Line 32, delete "WCDMA Wide CDMA" and insert -- WCDMA Wideband CDMA --, therefor.

In Column 59, Line 33, delete "WLAN Wide Local Area Network" and insert -- WLAN Wireless Local Area Network --, therefor.

In the Claims

In Column 61, Line 18, Claim 13, delete "device" and insert -- device for --, therefor.

In Column 62, Line 16, Claim 18, delete "device" and insert -- device for --, therefor.